(12) United States Patent
Blochouse et al.

(10) Patent No.: US 10,672,567 B2
(45) Date of Patent: Jun. 2, 2020

(54) MCC CLOSED DOOR OPERATION (CDO) PUSH BUTTON INTERLOCK MECHANISM

(71) Applicant: SCHNEIDER ELECTRIC USA, INC., Andover, MA (US)

(72) Inventors: Philippe Blochouse, Savoie (FR); Pierre Carle, Saint Pierre d'Albigny (FR); Manuel Antonio Becerra Becerra, Apodaca (MX); Siva Rama Krishna Chavali, Murfreesboro, TN (US); Steven Wayne Dozier, Murfreesboro, TN (US); Mark Samuel Freville, Mount Juliet, TN (US)

(73) Assignee: Schneider Electric USA, Inc., Andover, MA (US)

( * ) Notice: Subject to any disclaimer, the term of this patent is extended or adjusted under 35 U.S.C. 154(b) by 98 days.

(21) Appl. No.: 15/724,531

(22) Filed: Oct. 4, 2017

(65) Prior Publication Data
US 2018/0096803 A1    Apr. 5, 2018

Related U.S. Application Data

(60) Provisional application No. 62/404,434, filed on Oct. 5, 2016.

(51) Int. Cl.
*H01H 9/22* (2006.01)
*H01H 13/50* (2006.01)
(Continued)

(52) U.S. Cl.
CPC .............. *H01H 9/22* (2013.01); *H01H 13/14* (2013.01); *H01H 13/20* (2013.01); *H01H 13/50* (2013.01);
(Continued)

(58) Field of Classification Search
CPC ........ H02B 1/36; H02B 11/12; H02B 11/127; H02B 11/133; H02B 11/173; H02B 1/21;
(Continued)

(56) References Cited

U.S. PATENT DOCUMENTS 7,019,229 B1 * 3/2006 Weister .................... H01H 9/22
                                                        200/50.01
8,288,669 B2 * 10/2012 Capelli ................ H02B 11/127
                                                        200/50.24
(Continued)

*Primary Examiner* — Felix O Figueroa
(74) *Attorney, Agent, or Firm* — Locke Lord LLP

(57) ABSTRACT

A closed door operation racking device is provided for racking a circuit breaker to and from a power bus from outside of a housing of a motor control center unit. The racking device includes a racking operator assembly and a push-button interlock assembly. The racking operator is configured to rack-in the electrical device and connect the stabs to a power bus in a connected position and to rack-out the electrical device and disconnect the stabs from the power bus in a disconnected position. The push-button interlock assembly prevents the operation of the racking operator under certain conditions, and includes a spring-loaded locker assembly and a spring-loaded push-button operator assembly. A push-button operator of the push-button operator assembly is depressed to disengage the locker assembly from the racking operator to allow operation of the racking operator.

12 Claims, 35 Drawing Sheets

(51) Int. Cl.
*H01H 13/20* (2006.01)
*H01H 13/14* (2006.01)
*H02B 1/36* (2006.01)
*H02B 11/12* (2006.01)
H02B 11/133 (2006.01)
H02B 1/21 (2006.01)
H02B 11/173 (2006.01)

(52) U.S. Cl.
CPC .............. H02B 1/36 (2013.01); H02B 11/12 (2013.01); H01H 2221/052 (2013.01); H02B 1/21 (2013.01); H02B 11/133 (2013.01); H02B 11/173 (2013.01)

(58) Field of Classification Search
CPC .......... H01H 9/22; H01H 13/14; H01H 13/20; H01H 13/50; H01H 2221/052
See application file for complete search history.

(56) References Cited

U.S. PATENT DOCUMENTS

| | | | |
|---|---|---|---|
| 8,355,243 B2 * | 1/2013 | Niedzwiecki | H02B 11/133 200/50.24 |
| 9,531,169 B2 * | 12/2016 | Oneufer | H02B 1/46 |
| 9,576,751 B1 * | 2/2017 | Handshoe | H01H 3/26 |
| 9,607,784 B2 * | 3/2017 | Benke | H01H 9/24 |

* cited by examiner

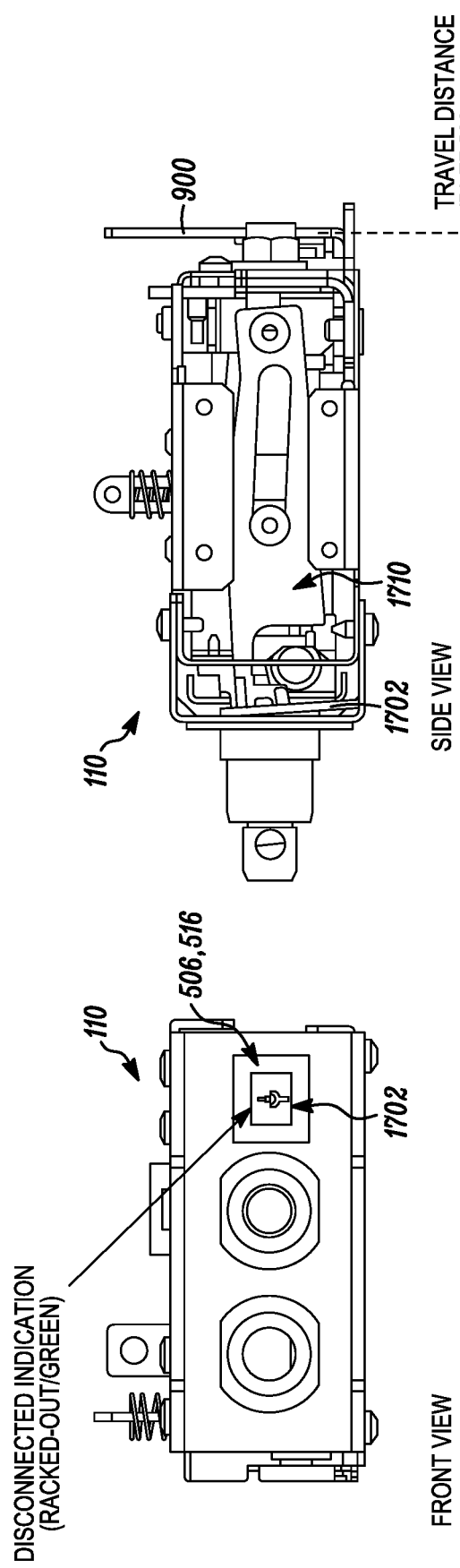
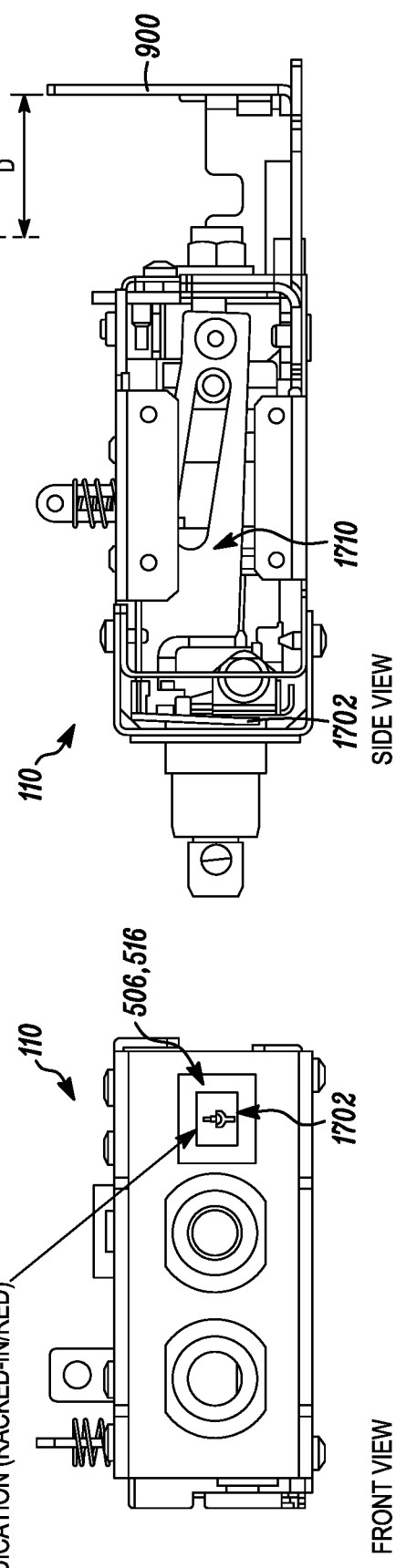
FIG. 18B
FIG. 19B
FIG. 18A
FIG. 19A

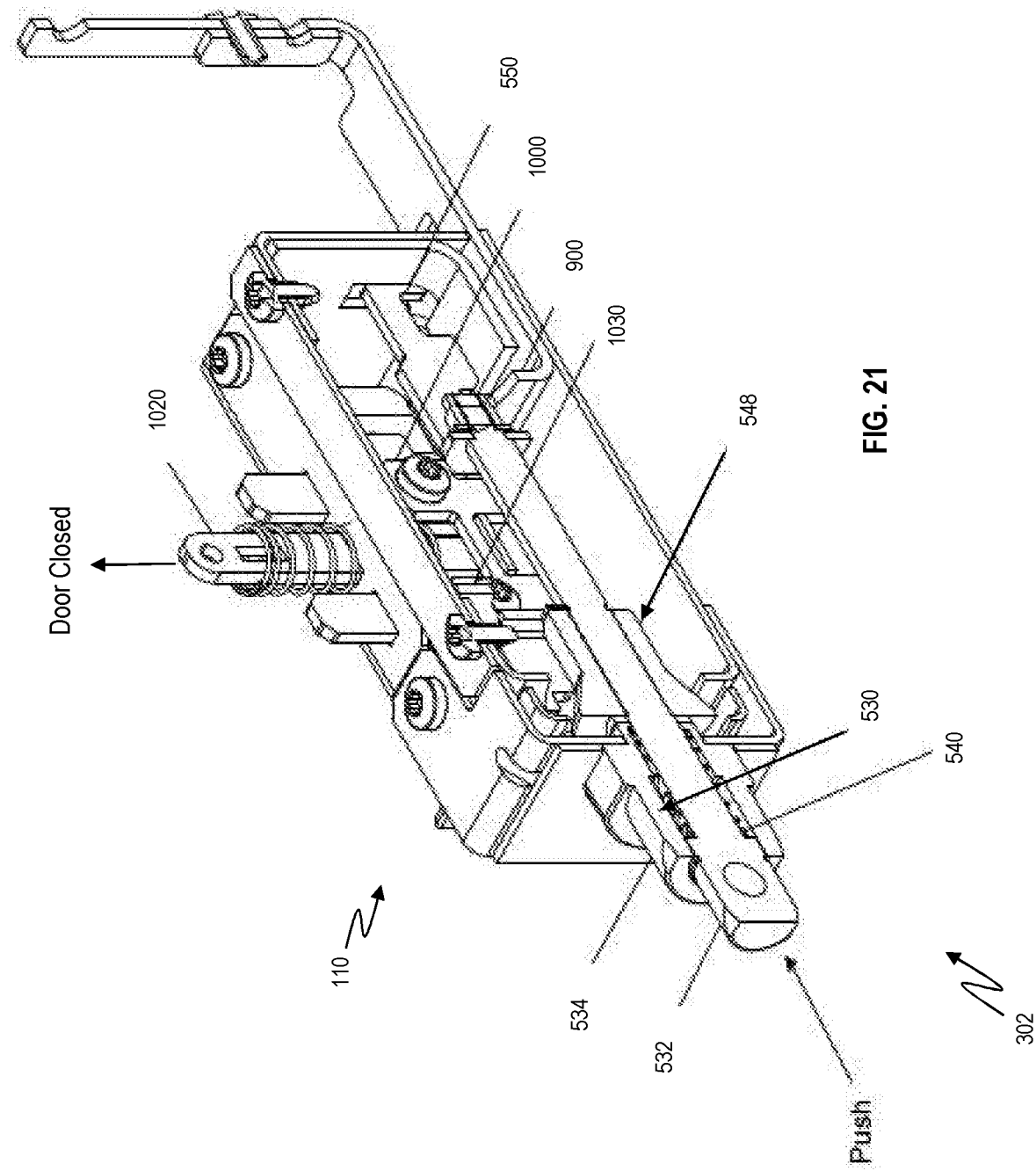

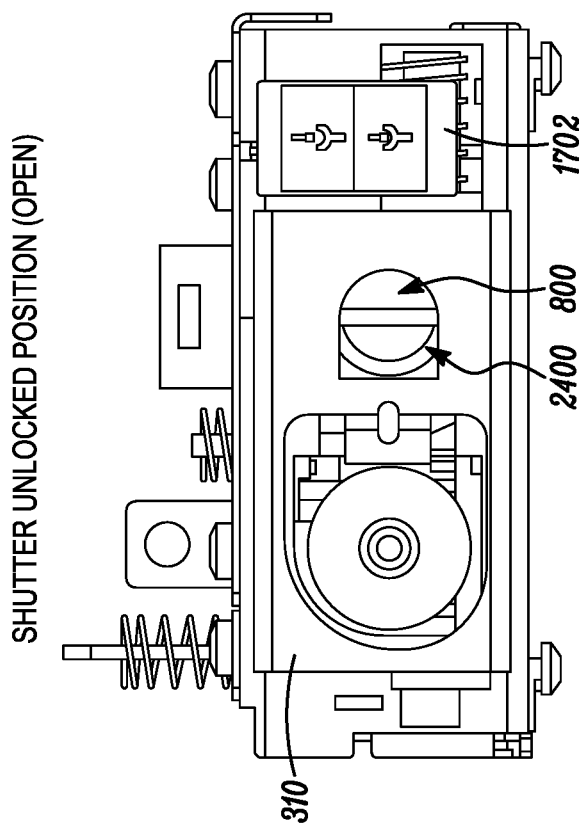
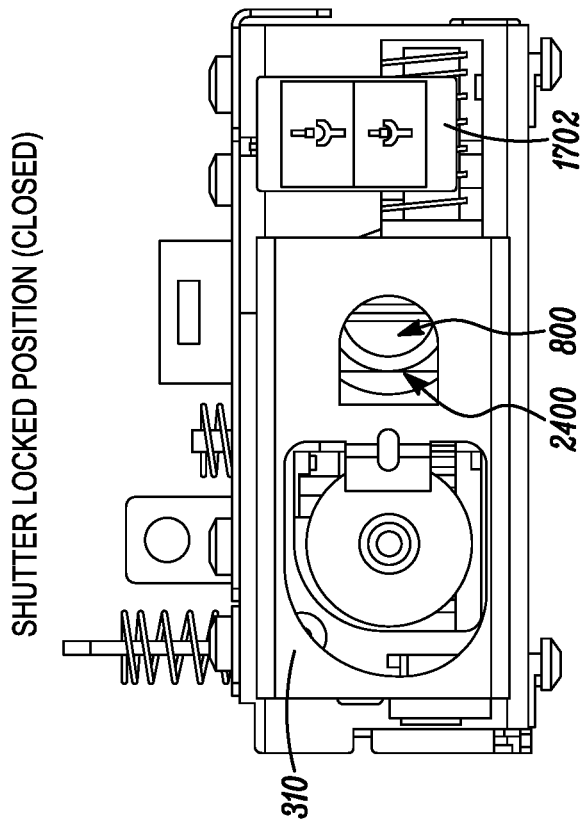

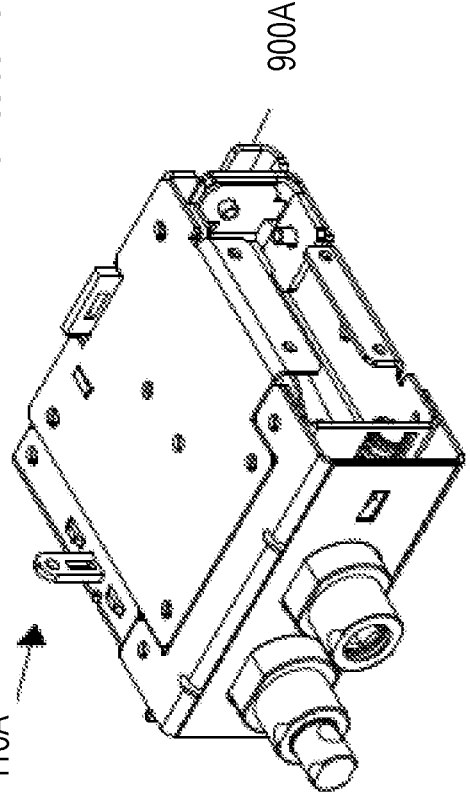
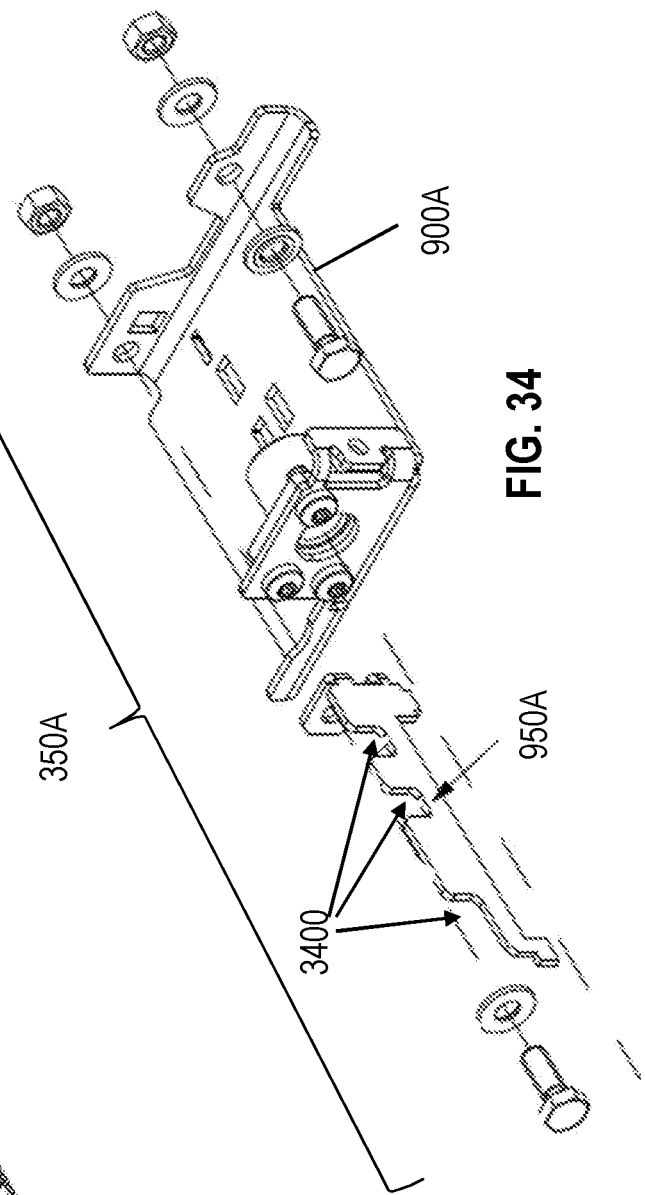
FIG. 33
FIG. 34

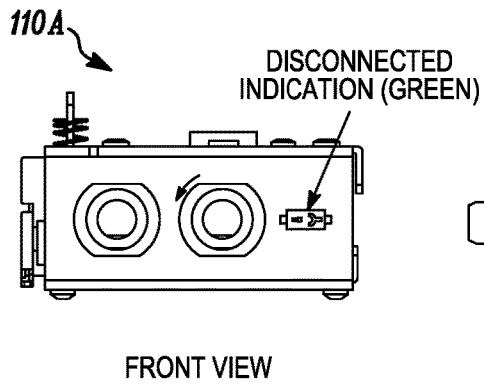
FRONT VIEW
FIG. 35A-A
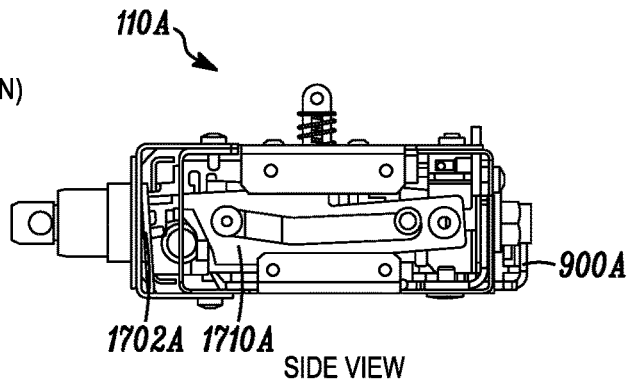
SIDE VIEW
FIG. 35A-B
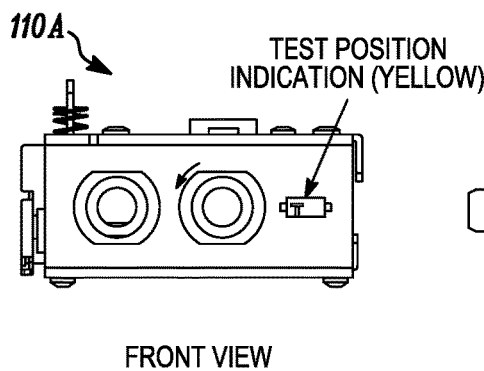
FRONT VIEW
FIG. 35B-A
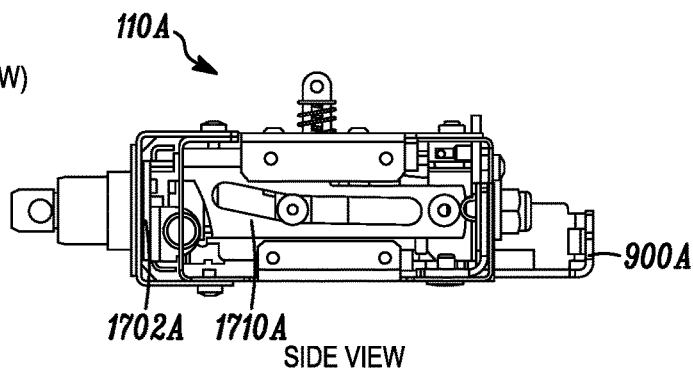
SIDE VIEW
FIG. 35B-B
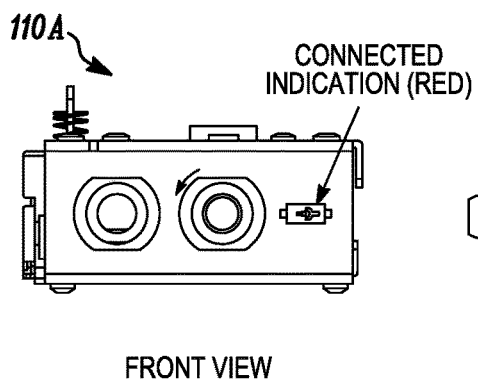
FRONT VIEW
FIG. 35C-A
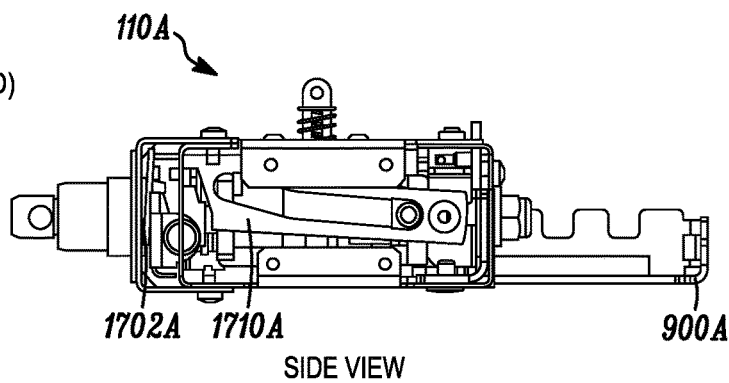
SIDE VIEW
FIG. 35C-B

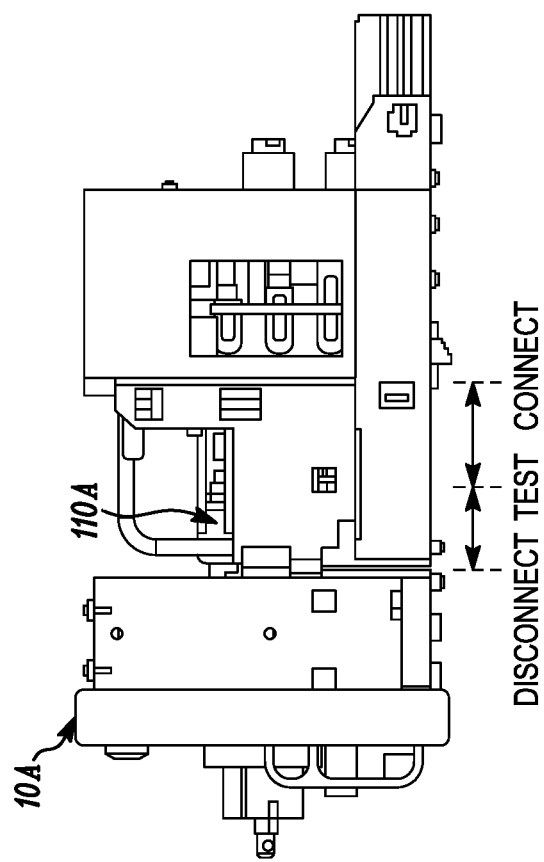
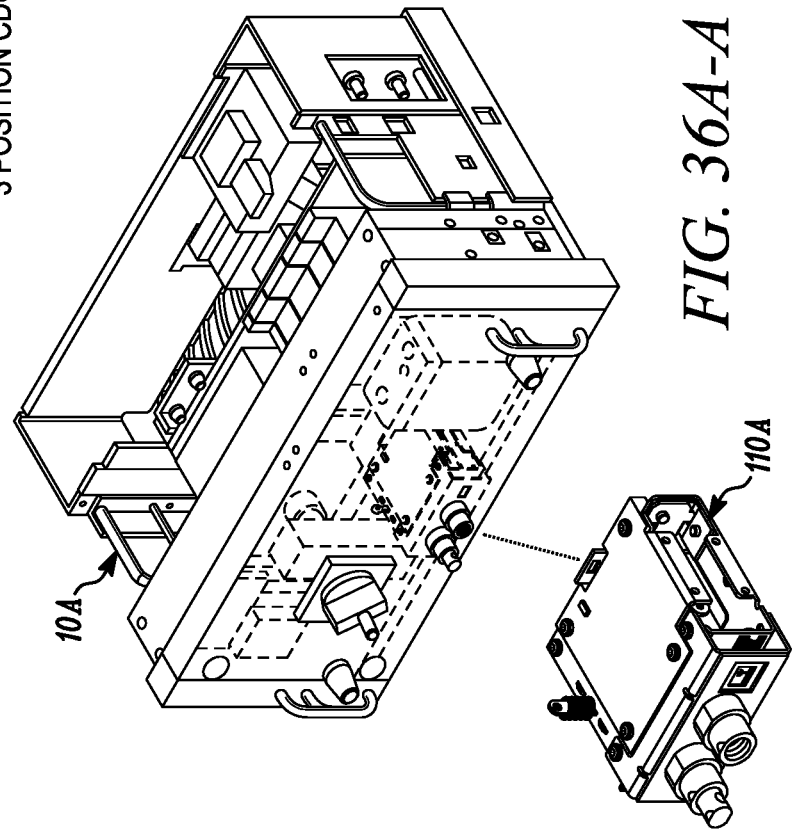
FIG. 36B
FIG. 36A-A
FIG. 36A-B

MCC CLOSED DOOR OPERATION (CDO) PUSH BUTTON INTERLOCK MECHANISM

RELATED CASES

The present application claims priority under 35 U.S.C. 119(e) to U.S. Patent Application Ser. No. 62/404,434, filed Oct. 5, 2016 entitled MCC CLOSED DOOR OPERATION (CDO) PUSH BUTTON INTERLOCK MECHANISM, which is incorporated by reference in its entirety.

FIELD

The present disclosure is related to an interlock system for an electrical system, and more particularly, to an interlock system for a closed door racking device for a motor control center (MCC) unit.

BACKGROUND

A motor control center, also referred to as an MCC, is generally a cabinet-like structure that is divided into modular sections designed to accept a plurality of component motor control center units, also referred to as MCC units. An MCC unit is generally a drawer-like container of electrical components, such as circuit breakers, motor starters, relays, power meters, programmable logic controllers, and other control circuit components used for electrical power distribution in industrial and commercial applications. The MCC unit slides into an MCC section and plugs into a common power bus running vertically along the back side of the MCC section. The MCC unit includes a connector, also referred to as a stab assembly or stabs, arranged on the back side of the unit, to plug into the power bus. When an MCC unit is installed, serviced, or removed from an MCC section, it is of utmost importance to prevent the operator from being exposed to electrical hazards. In existing MCC units, an operator accessible unit on/off handle on the front of the MCC unit enables a circuit breaker within the unit to be switched off before the MCC unit is installed in or removed from the MCC section.

Unit interlock mechanisms have been provided in the past to prevent inserting or removing MCC units from an MCC section, without first actuating an advance/retract handle located on the front of the MCC unit, to retract the stabs of the unit to prevent contact with the power bus. The unit interlock blocks inserting the MCC unit into the motor control center section, without first actuating the advance/retract handle for the advance/retract mechanism to retract the stabs to prevent contact with a power bus. To insert the MCC unit into the MCC section, the operator slides the MCC unit into an available opening in the section, so that the back wall of the MCC unit is close to the common power bus running along the back side of the section. The operator then actuates the advance/retract handle for the advance/retract mechanism to connect the stabs of the MCC unit to the power bus.

Many MCC units include electrical devices such as circuit breakers connected to the stabs that may be any form of connector of the circuit breaker to the power bus. One example of an existing MCC unit mounts the circuit breaker and the stabs on a pivoted platform, also referred to as the unit line power jaws. The pivoted platform is connected to the advance/retract mechanism that is operated by the advance/retract handle. Operating the advance/retract handle forces the platform to pivot and either advance the stabs to contact the power bus or retract the stabs to disconnect them from the power bus. The existing unit interlock in an MCC unit, blocks the unit from being inserted into the MCC section when the stabs are advanced, to avoid any connection to the power bus during insertion of the unit. After the MCC unit has been inserted into the MCC section, the unit interlock blocks the unit from being removed from the MCC section after stabs have been advanced and connected to the power bus. The advance/retract mechanism must retract the stabs before the unit interlock allows the unit to be removed from the section.

SUMMARY

To further improve operator safety, a closed door operation (CDO) racking device is provided, with interlock mechanisms, to allow an operator to safely rack-in or rack-out an electrical device, such as a circuit breaker, in order to connect or disconnect, respectively, the device from a power bus, only when certain conditions are satisfied. The racking device includes a racking operator which can be operated from outside an enclosure (e.g., a housing) of a unit, such as an MCC unit, to rack-in or rack-out the electrical device. The interlock mechanisms of the racking device can be configured to prevent a racking operation of the electrical device from being performed, unless the door to the enclosure is closed and a push-button sequence is performed to disengage interlock mechanisms from the racking operator.

In one example, the racking device includes a racking operator assembly and a push-button interlock assembly. The racking operator assembly is configured to rack-in the electrical device and connect the stabs to a power bus in a connected position, and to rack-out the electrical device and disconnect the stabs from the power bus in a disconnected position. The racking operator assembly includes a rotatable rod assembly, and a translatable slider assembly connectable to a moveable support for the electrical device. The rod assembly is operable from outside of the housing of the electrical device to move the slider assembly between the disconnected position and the connected position when the rod assembly is rotated. The slider assembly includes an indexer having a first slot, a second slot, and a raised segment adjacent to the first and second slots which are arranged along a length of the indexer. The rod assembly includes a gear.

The push-button interlock assembly includes a spring-loaded locker assembly and a spring-loaded push button operator assembly. The spring-loaded locker assembly has a locker with a gear lock connected to a bushing. The locker is moveable between a locked position and an unlocked position. The locked position prevents movement of the slider assembly, when the gear lock of the locker is engaged to the gear of the rod assembly and the bushing is situated in one of the slots of the indexer. The unlocked position allows movement of the slider assembly between the disconnected position and the connected position when the gear lock of the locker is disengaged from the gear of the rod assembly.

The spring-loaded push button operator assembly includes a fork that has first and second prongs, and a push button assembly with a external push-button to be arranged outside the housing. The push button is connected to the fork. The first prong has a ramped surface leading to a catch, and the second prong has a hook. The push button is operable from an extended position to a depressed position in order to release the gear lock into the unlocked position.

When the push-button is depressed, the first prong of the fork picks up the bushing from one of the first and second slots, and places the bushing into the catch which raises the bushing, and thus, the gear lock to the unlocked position. When the gear lock is in the unlocked position, the rod assembly is operable to move the slider assembly from one of the disconnected and connected positions to the other of the disconnected and connected positions. The movement of the slider assembly lifts the bushing out of the catch, and onto the raised segment of the indexer, where the bushing is caught by the hook of the second prong of the fork to hold the push-button operator assembly in an intermediate position. After the push-button operator assembly has reached the intermediate position, the rod assembly is operable to move the slider assembly into the other of the disconnected and connected positions in which the bushing drops into the other of the first and second slots and the push-button operator assembly returns to the extended position (e.g., a resting position).

The push-button operator assembly can include an external push-button cover for covering the push-button. The push-button can be fully extended from the push-button cover in the extended position, the push-button can be partially extended from the push-button cover in the intermediate position, and the push-button can be fully covered in the depressed position.

The racking device can also include a door interlock assembly to prevent operation of the push-button operator assembly when a door of the housing is open. The door interlock assembly can include a spring-biased push-button locker operable between an unlocked position to allow operation of the push-button operator assembly, and a locked position to prevent operation of the push-button operator assembly. The push-button locker can include a finger and a stop bracket. The stop bracket is engaged to the push-button operation assembly in the locked position to prevent operation thereof, and is disengaged from the push-button operation assembly in the unlocked position to allow operation thereof. The finger is connectable to a lever via a spring which is connected between the finger and the lever. The lever is moveable between a door open position when the door is open, and a door closed position when the door is closed. When the finger is pulled by the lever in the closed door position via the spring, the stop bracket is disengaged from the push-button operation assembly into the unlocked position. The push-button operation assembly can further include a shaft that is connected between the push-button and the fork, and a push-button barrel that is arranged on the shaft. The stop bracket blocks the push-button barrel to prevent operation of the push-button operator assembly, when the push-button locker is in the locked position.

The rod assembly can include a rotatable rod having threads along a length of the rod, and the slider assembly can include a slider and a barrel connected to the slider. The barrel includes a threaded bore for engaging the threads of the rod. The slider moves along a length of the rod when the rod is rotated.

The rod assembly can include a rotatable rod with an internal rod connected to the slider assembly, and a spring-biased external rod having a tool receptacle for receiving a tool. The external rod has an extended position in which the external rod is disengaged from the internal rod, and a depressed position in which the external rod is engaged to the internal rod. The external rod is operable between the extended position and the depressed position using the tool. In the depressed position, the external rod is rotatable in one direction to move the slider via the internal rod to the disconnected position or the connected position.

The push-button interlock assembly can further include a shutter interlock that has a shutter which is moveable between a shutter unlocked position and a shutter locked position. The shutter includes a shutter opening. The shutter unlocked position allows the external rod to extend through the shutter opening and engage the internal rod in the depressed position, and the shutter locked position prevents the external rod from engaging the shaft. The push-button operator assembly further includes a tapered push-button barrel connected to the push-button. When the push-button is depressed, the push-button barrel moves the shutter from the shutter locked position to the shutter unlocked position.

The racking device can further include an operator handle interlock assembly to prevent operation of the slider assembly when an operator handle assembly for the electrical device is in an ON position which turns ON the electrical device. The operator handle interlock assembly includes a spring-biased slider locker carrying a blocking pin. The blocking pin is moved by the operator handle assembly to a pin locked position when the operator handle assembly is in the ON position, and to a pin unlocked position when the operator handle assembly is in an OFF position to turn OFF the electrical device. The blocking pin engages the slider assembly in the pin locked position, and disengages from the slider assembly in the pin unlocked position.

DESCRIPTION OF THE FIGURES

The description of the various example embodiments is explained in conjunction with the appended drawings.

FIG. 18 (18A and 18B) and FIG. 19 (19A and 19B) illustrate a front view and a side view of the racking device of FIGS. 1-4 in a disconnected/racked-out position and a connected/racked-in position, respectively, in accordance with an example embodiment of the present disclosure.

FIG. 21 illustrates a cross-sectional view of the racking device of FIG. 15A along the section A-A, which shows the operation of a fork of a push-button operator assembly when the push-button is in the extended position, in accordance with an example embodiment of the present disclosure.

FIGS. 24A and 24B illustrate a shutter assembly of a push-button interlock assembly in a locked position to prevent operation of a racking operator and an unlocked position to allow operation of the racking operation, respectively, in accordance with an example embodiment of the present disclosure.

FIG. 33 illustrates an example closed door operation racking device that is operable between three positions, including a disconnected position, a test position, and a connected position, in accordance with an example embodiment of the present disclosure.

FIG. 34 illustrates an example of a slider assembly of the racking device of FIG. 33, in accordance with an example embodiment of the present disclosure.

FIGS. 35A (35A-A and 35A-B), FIGS. 35B (35B-A and 35B-B) and FIGS. 35C (35C-A and 35C-B) illustrate a front view and a side view of the racking device of FIG. 33 in a disconnected position, a test position, and a connected position, respectively, in accordance with an example embodiment of the present disclosure.

FIGS. 36A (36A-A and 36A-B) and FIG. 36B illustrate an electrical unit with the three position racking device of FIG. 33.

DISCUSSION OF EXAMPLE EMBODIMENTS

Figure 1:
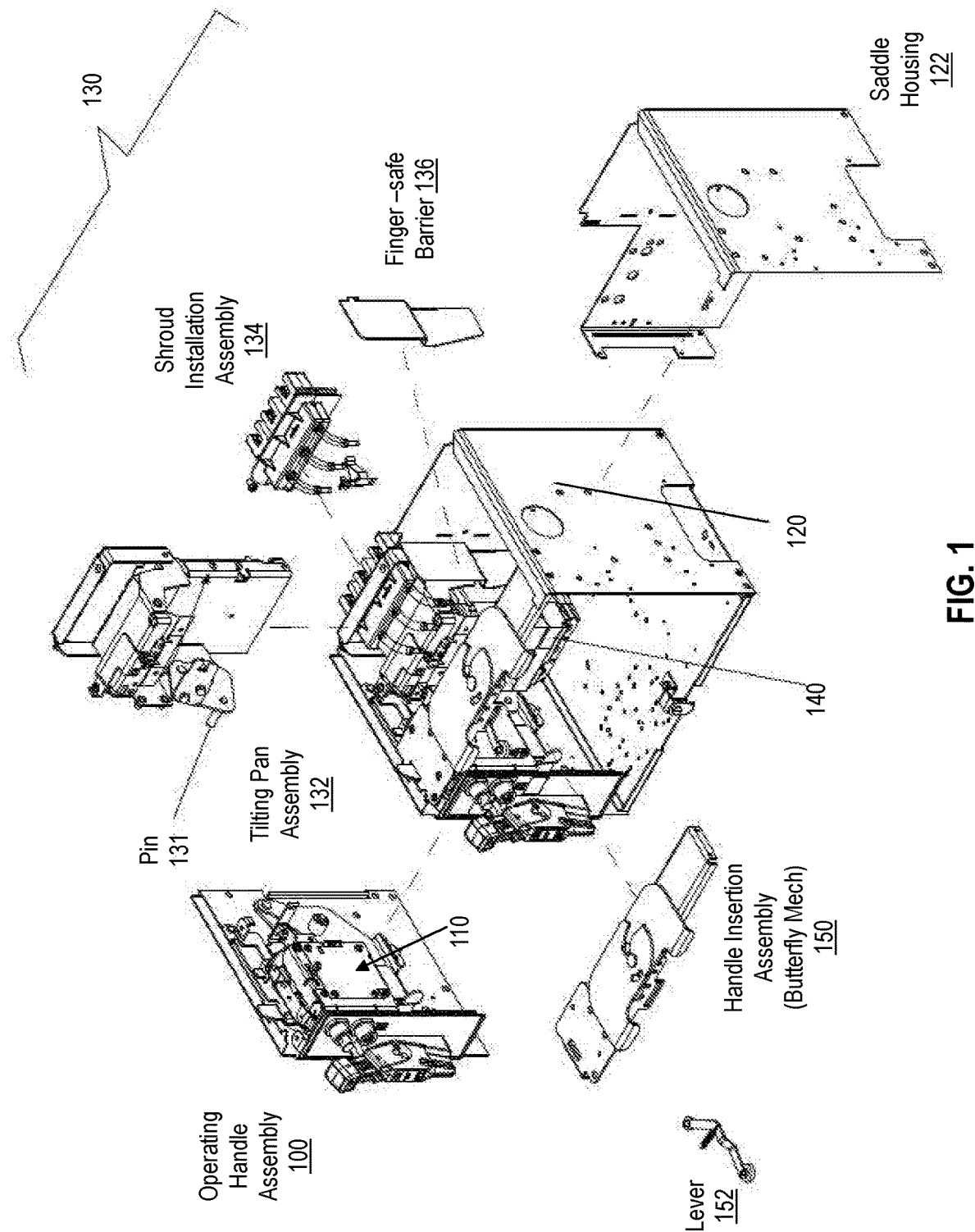
FIG. 1 illustrates a block diagram of an example electrical unit, with a closed door operation (CDO) racking device and interlock systems, which can be inserted into or removed from an electrical cabinet, such as a motor control center (MCC), in accordance with an example embodiment of the present disclosure.

FIG. 1 illustrates an example a modular unit 10 for an electrical cabinet, such as a low voltage motor control center (MCC). The unit 10 includes a housing 120 for housing electrical and mechanical components. The unit 10 includes an electrical device with electrical stabs such as a circuit breaker 140, as well as an operator handle assembly 100 to operate the circuit breaker 140, and a handle insertion assembly 150 (e.g., a butterfly mechanism) which carries a lever 152 that can pivot. The unit 10 also includes a moveable support assembly 130 for supporting and moving the circuit breaker 140. The moveable support assembly 130 is moveable to a connected position (also referred to as "racked-in position") in which the stabs of the circuit breaker 140 are connected to a power bus (e.g., electrical conductors or bars) or to a disconnected position (also referred to as a "racked-out position") in which the stabs are disconnected from the power bus. In this example, the moveable support assembly 130 includes a tilting pan assembly 132 (with a pin 131) to support and move the circuit breaker 140, a shroud installation assembly 134 (e.g., a wire harness with the stabs for the circuit breaker 140), and a finger-safe barrier 136 to prevent side access to the circuit breaker 140. The unit 10 further includes an operator handle assembly 100, which can be manipulated automatically or manually to turn the circuit breaker 140 ON or OFF. The housing 120 can include a saddle 122.

To further protect maintenance, repair and other personnel working on the unit 10, a closed door racking device 110 (also referred herein as "racking device") is provided that includes a racking operator, which can be automatically or manually manipulated from outside of the unit 10 (e.g., outside the housing 120 with the door closed), to rack-in or rack-out the circuit breaker 140. The racking device 110 also includes various interlocks to prevent the operation of the racking operator unless certain conditions are satisfied. The interlocks of the racking device 110 can include an operator handle interlock assembly which prevents operation of the racking operator when the operator handle for the circuit breaker 140 has been positioned to turn the circuit breaker 140 ON; a push-button interlock which prevents operation of the racking operator unless a push-button has been pressed to release a shutter and a locker; and a door interlock which prevents operation of the push-button, and thus the racking operator, when the door to the unit 10 is open. The unit 10 can also include other interlocks, such as a structure interlock assembly to prevent removal of the unit 10 (or another unit stacked on top of the unit) from an electrical cabinet when the circuit breaker 140 is racked-in, an interlock to prevent the door of the unit 10 from opening when the circuit breaker 140 is in the ON state, and a power-stab assembly interlock to prevent operation of the operator handle for the circuit breaker 140 when the circuit breaker 140 is racked-out. The various components and operations of the racking device 110 and other components of the unit 10 will be described in detail below with reference to the figures.

Figure 2:
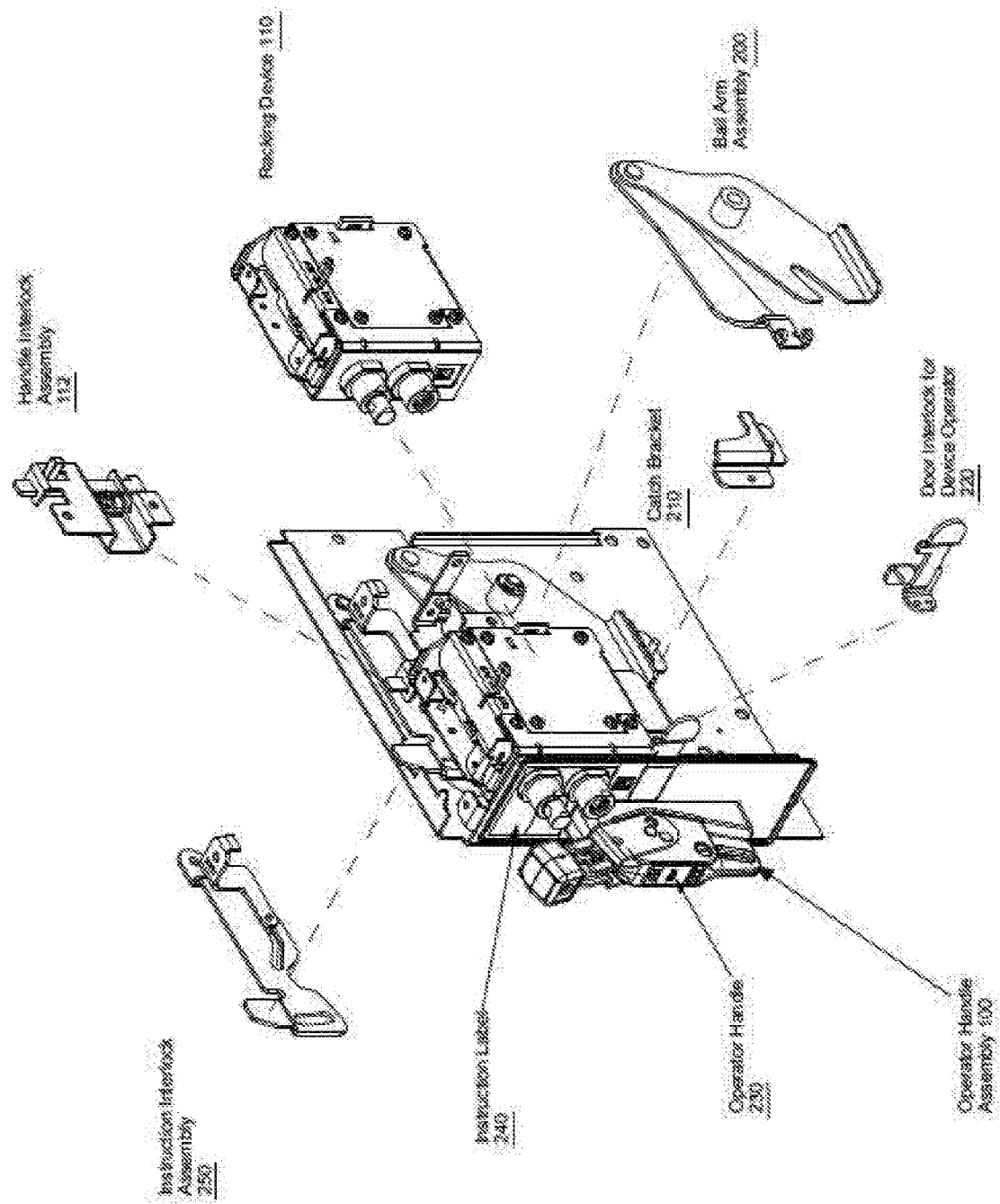
FIG. 2 illustrates an example of an operator handle assembly, along with the racking device, to operate an electrical device such as a circuit breaker which is housed in the unit of FIG. 1, in accordance with an example embodiment of the present disclosure.

FIG. 2 illustrates an example of an operator handle assembly 100, along with the racking device 110 and other components of the unit 10 of FIG. 1. The handle assembly 100 includes an operator handle 230, which is connected to a bail arm assembly 200 (e.g., via a linkage element (not shown)) to operate an electrical device, such as the circuit breaker 140 housed in the unit 10 of FIG. 1, between an ON state and an OFF state. The operator handle 230 in FIG. 2 is shown in the OFF state. A power-stab interlock assembly is provided to prevent the operation of the operator handle 230, when the circuit breaker 140 of FIG. 1 is disengaged (e.g., disconnected or disengaged) from the power buses in a racked-out position. The power-stab interlock assembly includes a catch bracket 210 mounted to the housing 120. When the circuit breaker 140 and its support assembly 130 are in the disconnected position, the pin 131 (in FIG. 1) on the tilting pan assembly 132 is caught by the catch bracket 210, and thus, the bail arm assembly 200 (connected to the tilting pan assembly 132) and the operator handle 230 connected thereto cannot be operated into the ON position.

An interlock 220 is also shown which engages a latch on the door (not shown) and prevents the door of the unit 10 from being opened when the operator handle 230 is in the ON position. Furthermore, a structure interlock assembly 250, with a scissor mechanism having two blades, is mounted on an interior surface of the housing 120 proximate to the handle assembly 100. One of the blades is fixedly mounted to the housing 120, and the other blade, which is moveable, is connected to the tilting pan assembly 132. The moveable blade of the structure interlock assembly 250 includes an extending portion (e.g., a lock), which extends through a slot in the housing 120 in a locked position when the tilting pan assembly 132 is in the racked-in position. In the locked position, the structure interlock assembly 250 prevents removal of the unit 10 from an electrical cabinet or other structure, and/or prevents another unit that is, for example, stacked onto the unit 10 from being removed. In the locked position, the structure interlock assembly 250 also prevents insertion of the unit 10 into an electrical cabinet or other structure. When the tilting pan assembly 132 is in the racked-out position, the moveable blade carrying the extending portion of the structure interlock assembly 250 is pulled downwards into the housing 120 to an unlocked position so that the portion no longer extends through the slot of the housing 120. In the unlocked position, the structure interlock assembly 250 no longer prevents removal of the unit 10 or another unit stacked on top of the unit 10, or insertion of the unit 10 into the electrical cabinet.

As further shown in FIG. 2, the racking device 110 and a handle interlock assembly 112 (which can be part of the racking device 110 or connected thereto) are mounted to a front panel of the housing 120 along with the assembly of the operator handle 230. An outer surface of the front panel of the housing 120 also includes a space 240 for receiving an instruction label.

Figure 3:
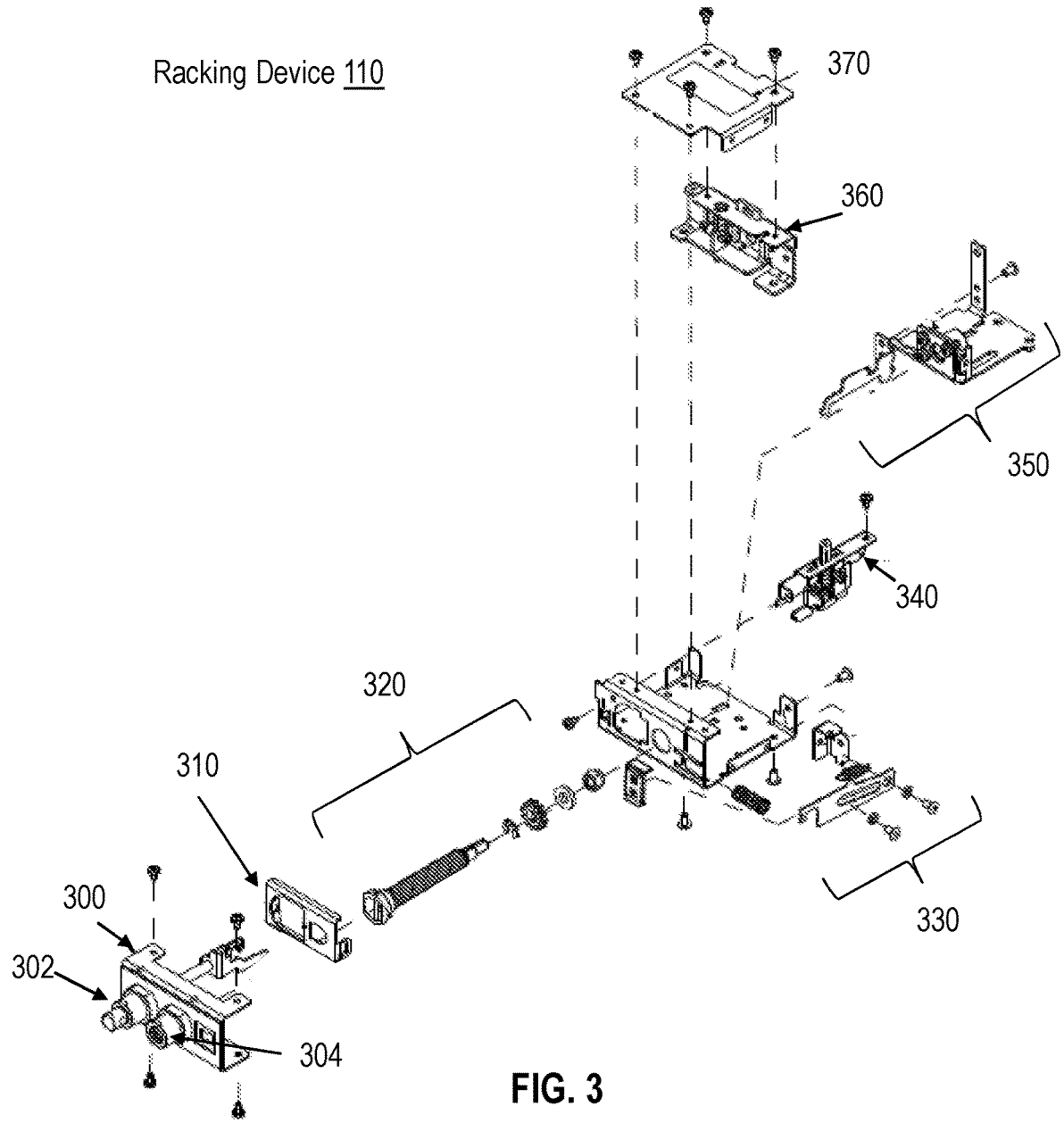
FIGS. 3 and 4 illustrate an exploded view and an assembled view, respectively, of the racking device of FIGS. 1 and 2, in accordance with an example embodiment of the present disclosure.
Figure 4:
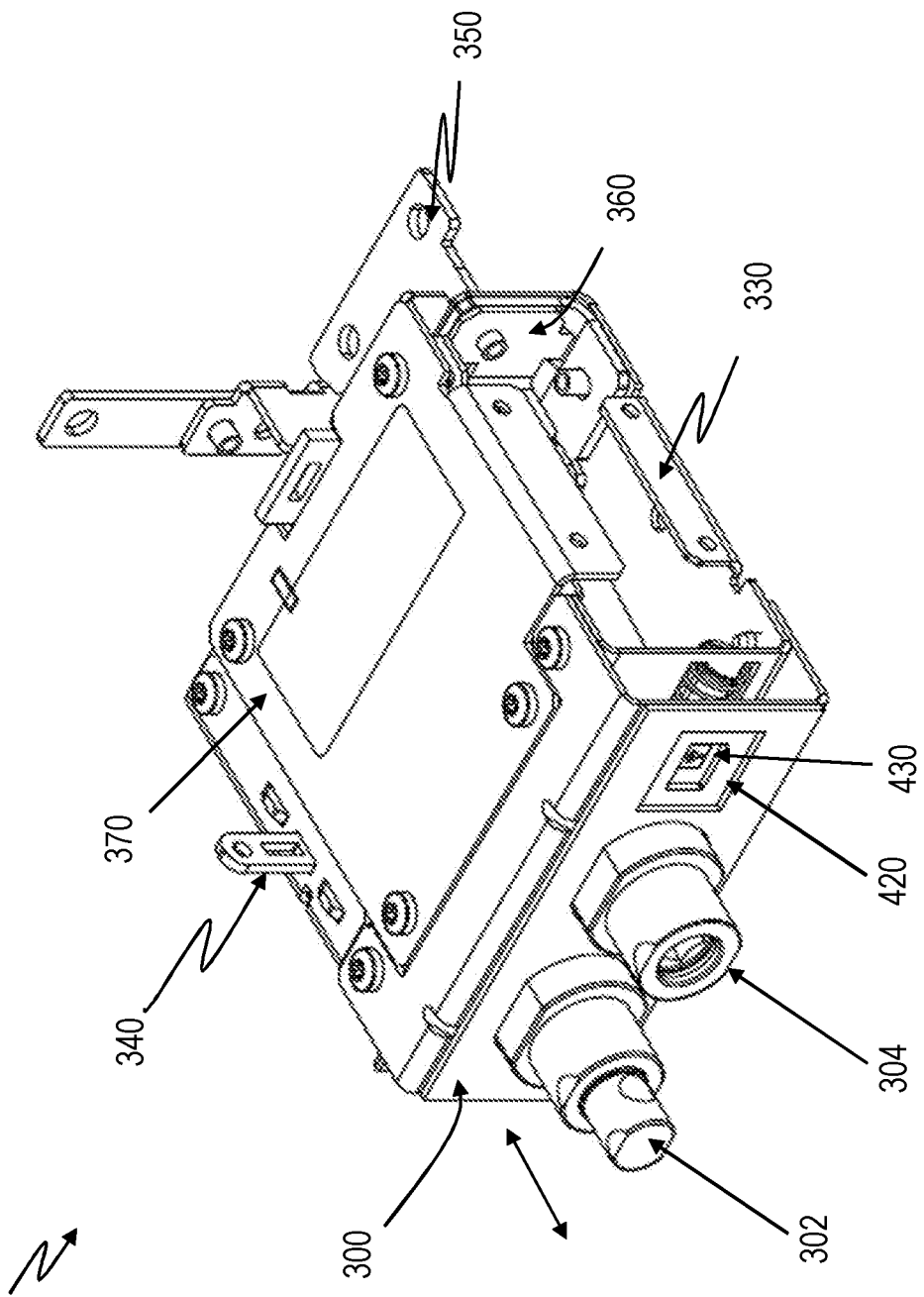

FIGS. 3 and 4 illustrate an exploded view and an assembled view, respectively, of the racking device 110 to rack in or rack out the circuit breaker 140 of the unit 10. The racking device 110 includes components of the push-button interlock assembly, the door interlock assembly, and the racking operator. For example, the racking device 110 includes a support 330 for supporting components of the push-button interlock assembly, the door interlock assembly, and the racking operator. The push-button interlock includes a push-button operator assembly 302, a shutter assembly 310, and a locker assembly 360. The racking operator includes an external rod assembly 304 (e.g., a hex rod with a tool receptacle for receiving a tool), an internal rod assembly 320 (e.g., a lead screw) which can be engaged to or disengaged from the external rod assembly 304, and a slider assembly 350. An assembly for the door interlock is shown by reference 340. The push button operator assembly 302 and the external rod assembly 304 of the racking operator are mounted in a front face panel 300 of the racking device 110. The front face panel 300, the support assembly 330, a frame of the locker assembly 360, and a cover 370 together form part of a housing for the racking device 110.

The rod assemblies 304 and 320, when engaged, can be rotated in one direction or the opposite direction to translate (e.g., move) the slider assembly 350 between a plurality of positions such as a racked-in position to connect the circuit breaker to the power bus and a racked-out position to disconnect the circuit breaker from the power bus. Before the racking operator can be manipulated, the push-button operator assembly 302 must be operated, e.g., pushed inwards to disengage the components of the push button interlock, such as the shutter assembly 310 and the locker assembly 360, from the racking operator. Before the push-button operator assembly 302 can be manipulated, the door of the unit 10 of FIG. 1 must be closed to disengage the door interlock assembly 340 from the push-button operator assembly 302.

Figure 5A:
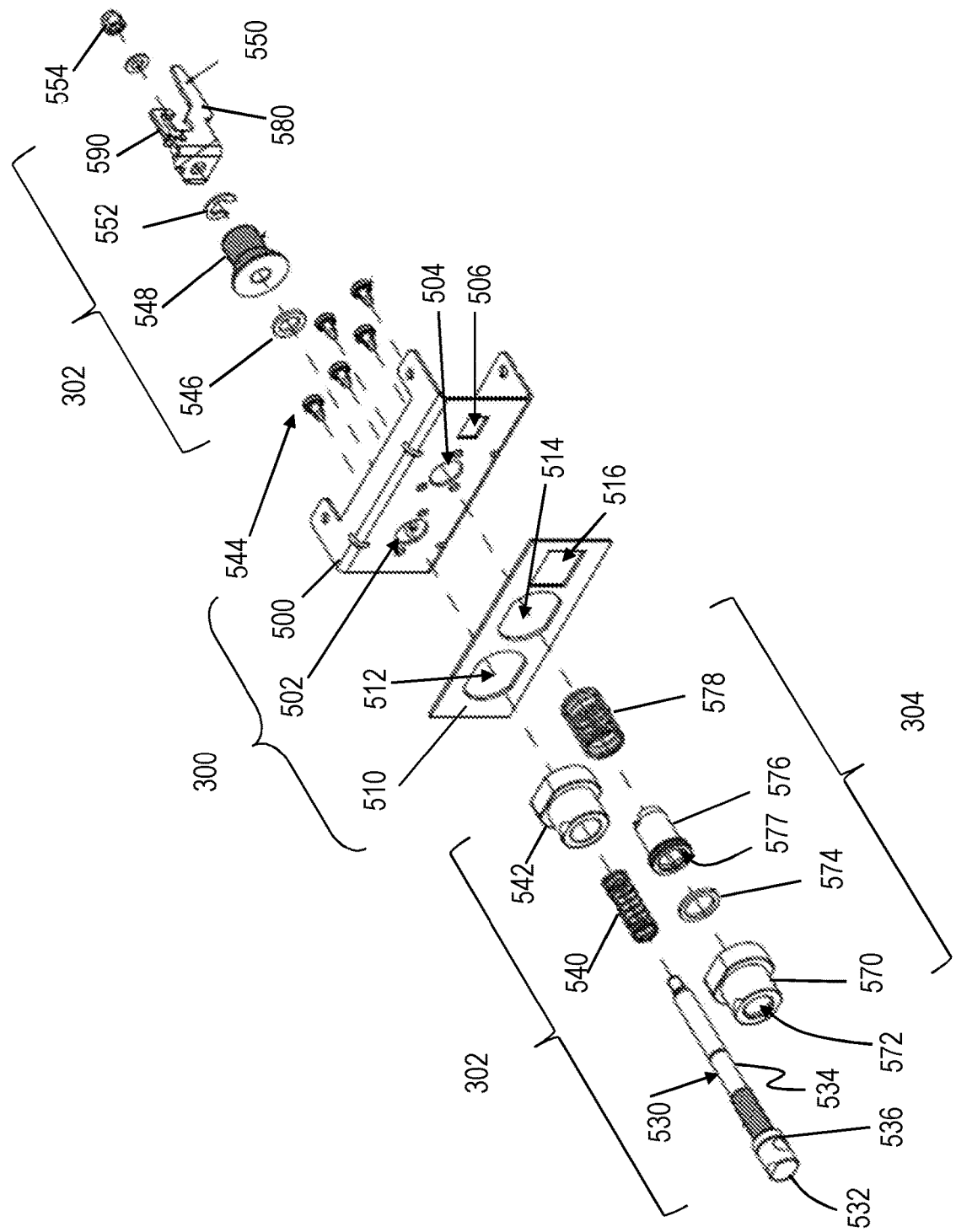
FIGS. 5A and 5B illustrate an exploded view and an assembled view, respectively, of a sub-assembly of a push-button interlock assembly of the racking device of FIGS. 1-4, in accordance with an example embodiment of the present disclosure.
Figure 5B:
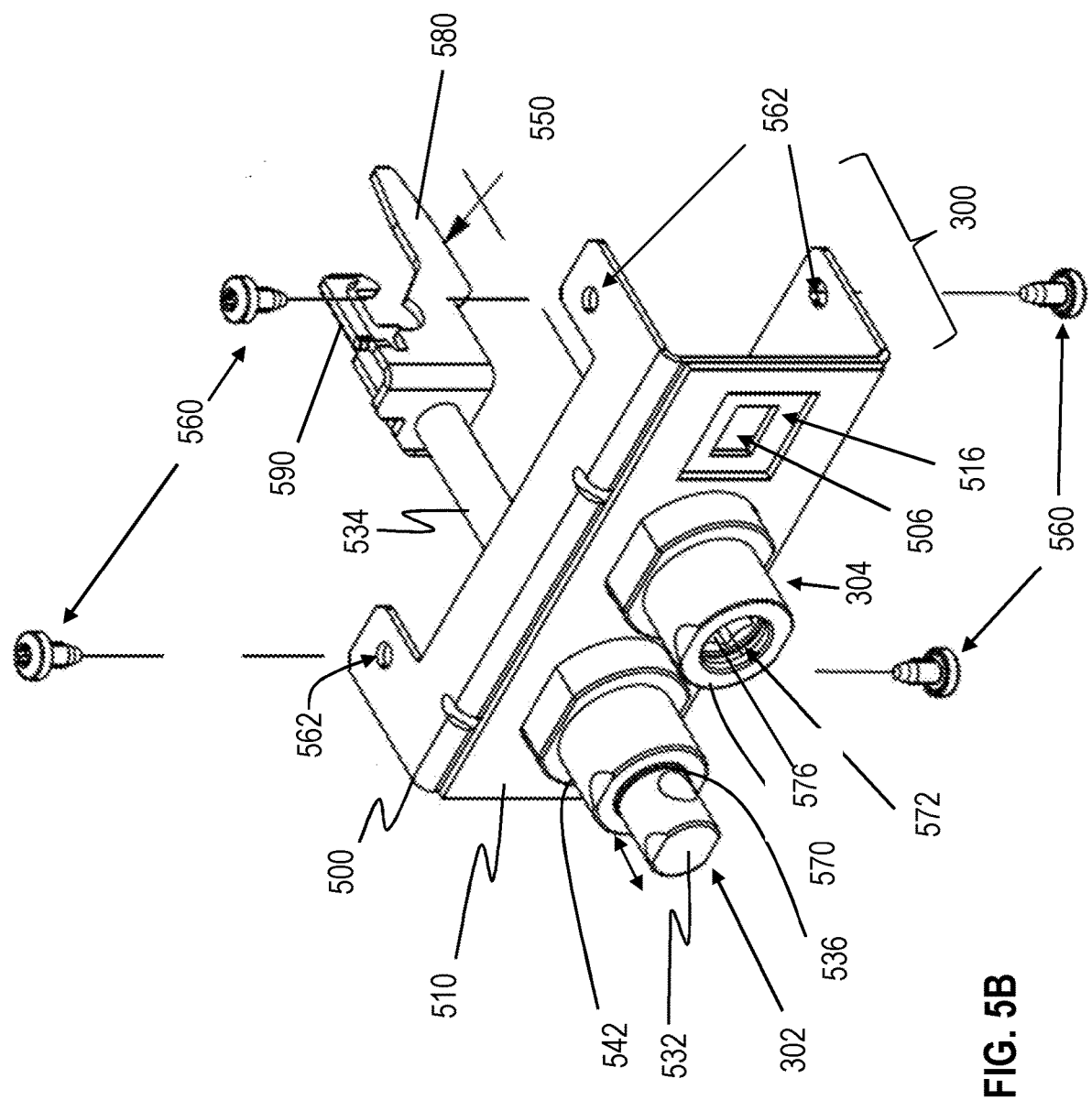

FIGS. 5A and 5B illustrate an exploded view and an assembled view, respectively, of the front panel 300 with the push-button operator assembly 302 and the external rod assembly 304. The external rod assembly 304 of the racking operator includes a cover 570 with a bore 572, a washer 574, an external rod 576 with a tool receptacle 577 (e.g., a socket), and a spring 578. The spring 578 is arranged over the external rod 576 and between the support plate 500 and a rim of the external rod 576, thereby providing an outward biasing force to the external rod 576. In operation, a tool can be engaged into the tool receptacle 577 to press the external rod 576 inwards into engagement with an internal rod assembly 320 (described further below) of the racking operator in order to operate the racking operator.

Figure 5C:
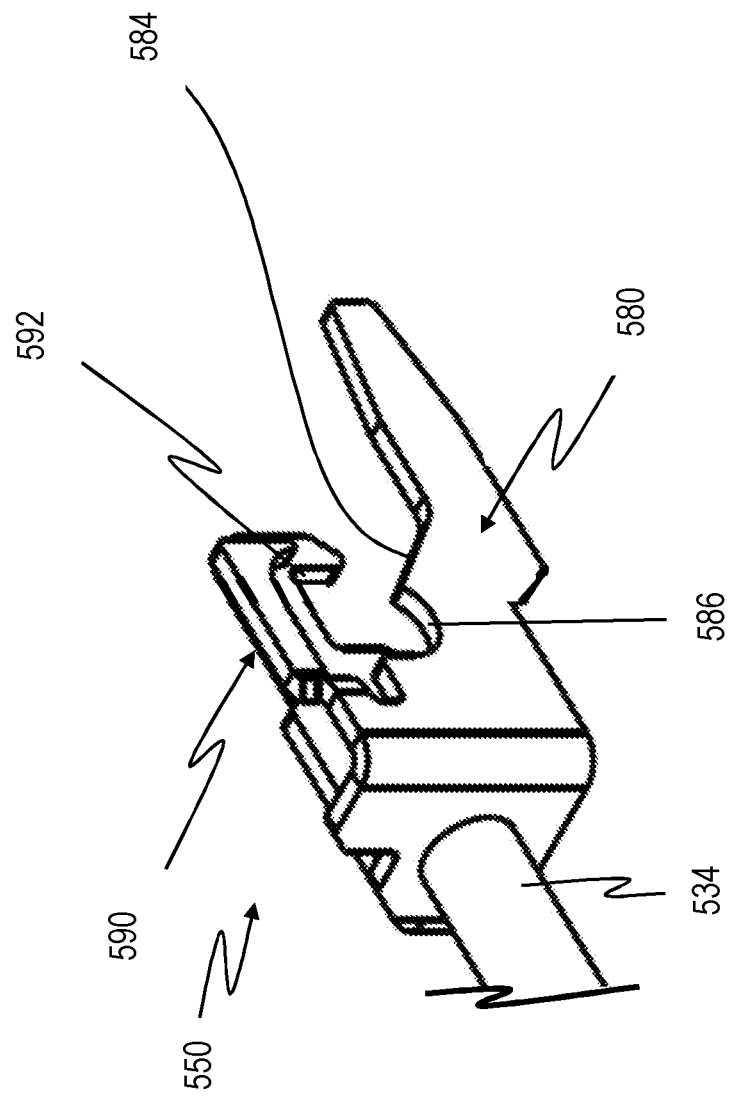
FIG. 5C illustrates an enlarged view of a fork of the push-button interlock assembly of FIGS. 5A and 5B.

In FIGS. 5A and 5B, the push-button operator assembly 302 includes a push-button assembly 530 with a push-button 532 connected on one end of a push-button shaft 534, as well as a spring 540, a push-button cover 542, a washer 546, a tapered barrel 548, a lock washer 552, a fork 550 and a nut 554. The push-button shaft 534 extends through the spring 540, the push-button cover 542, the washer 546 and the barrel 548, with the fork 550 connected at an end of the push-button shaft 534 by the nut 554 on an end of the shaft 534 opposite from the push-button 532. The lock washer 552 is used to lock the tapered barrel 548 at a position along the shaft 534. The fork 550 of the push-button operator assembly 302 is shown in greater detail in FIG. 5C. As shown in FIG. 5C, the fork 550 includes two spaced-apart prongs 580 and 590. The prong 580 includes a ramp 584, which leads to a catch 586 (e.g., a cavity). The prong 590 includes a hook 592 at an end (e.g., a tip).

As further shown in FIGS. 5A and 5B, the front panel 300 includes a back support plate 500 and a front plate 510 connected thereto. The back support plate 500 includes openings 502, 504 and 506. The front plate 510 includes openings 512, 514 and 516, which are aligned with corresponding openings 502, 504 and 506 of the support plate 500. The opening 512 is sized to hold the push button cover 542, and the openings 502 and 512 together are sized to only allow a portion of the push-button shaft 534 to extend therethrough (not the push-button 532, the spring 540 and the push-button cover 542 of the push-button operator assembly 302). The opening 514 is sized to hold the racking operator cover 570, and the openings 504 and 514 together are sized to only allow a portion of the external rod 576 to extend therethrough (not the racking operator cover 570, the washer 574 and the spring 578 of the external rod assembly 304 of the racking operator). The openings 506 and 516 provide a window for an indicator (not shown) to indicate the state of the racking device 110, such as connected indication (e.g., racked-in), disconnected indication (e.g., racked-out), and other positions, if available.

In general, by way of example, when the push-button operator assembly 302 in FIGS. 5A, 5B, and 5C is pushed inwards, the prongs 580 and 590 of the fork 550 interacts with the locker assembly 360 of FIGS. 3 and 4, particularly a bushing of the assembly (described further below), to disengage the locker assembly 360 from the racking operator, and thus, allow operation of the racking operator. Once the racking operator has been operated to a designated position, such as from the disconnected position to the connected position or vice-a versa, the fork 550 is released from the locker assembly 360 and the push-button operator assembly 302 returns to the extended position. At the extended position, the push-button 532 extends out from the push-button cover 542, with a push-button indicator 536 (e.g., a marker, line, colored groove, etc.) being displayed.

Furthermore, the tapered barrel 548 of the push-button operator assembly 302 in FIGS. 5A and 5B is in contact with the shutter assembly 310 (e.g., in FIG. 3), and moves the shutter assembly 310, which is spring-loaded, between a locked position and an unlocked position when the push-button assembly 530 is pushed inwards or released outwards relative to the racking device 110. In the locked position, the shutter assembly 310 prevents the external rod 576 from connecting to the internal rod assembly 320 (e.g., in FIG. 3), and thus, prevents operation of the racking operator from outside of the unit 10. In the unlocked position, the shutter assembly 310 is positioned to allow the external rod 576 to extend therethrough and connect to the internal rod assembly 320, thereby allowing manipulation of the racking operator. In this example, the spring 540 provides an outward biasing force to maintain the push-button 532 outside of the push-button cover 542 in a resting position or a final position. These operations will be discussed in greater detail below.

Figure 6:
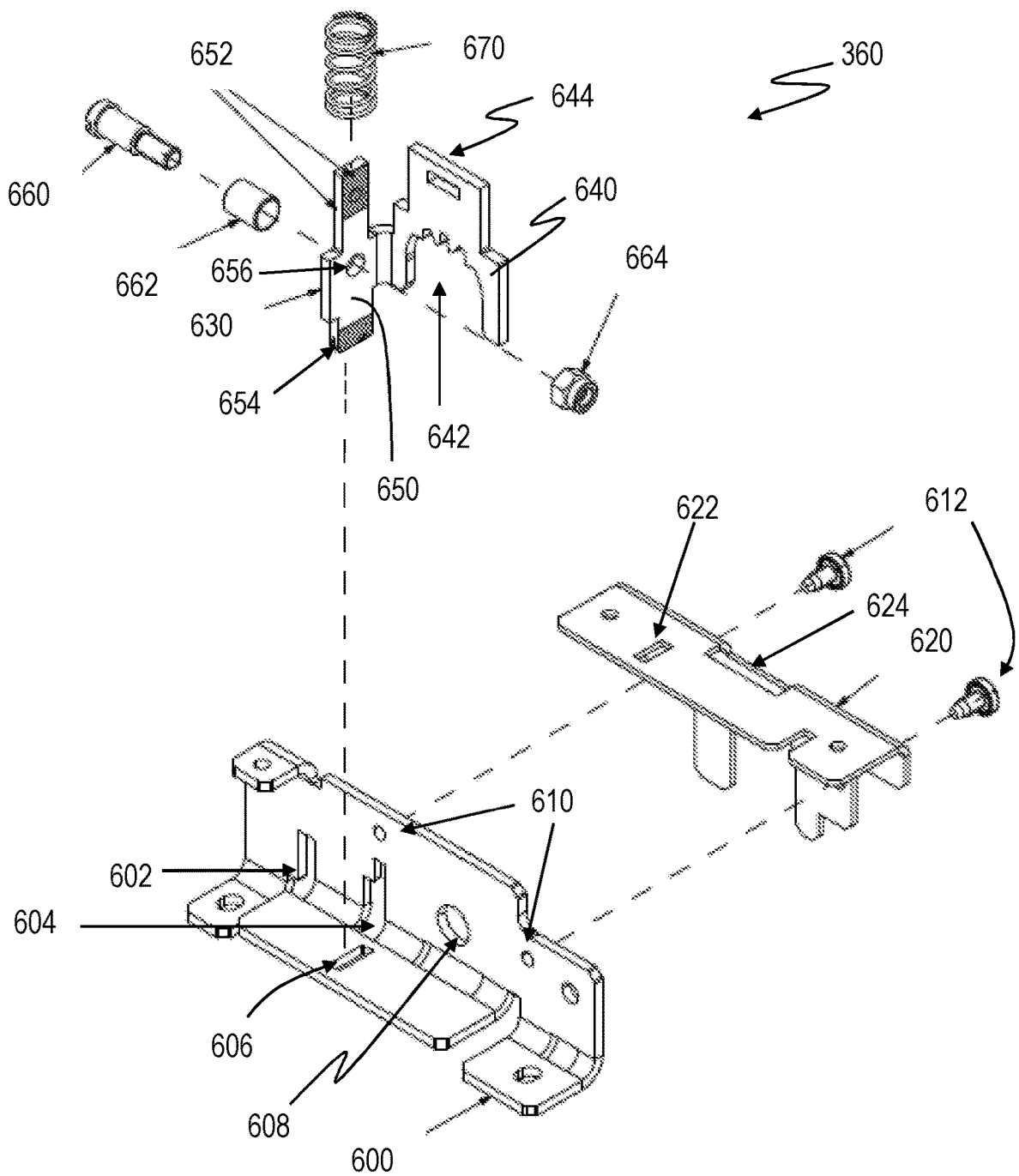
FIGS. 6 and 7 illustrate an exploded view and an assembled view, respectively, of a locker assembly of a push-button interlock assembly of the racking device of FIGS. 1-4, which prevents a racking operation unless a push-button is operated to release the locker assembly, in accordance with an example embodiment of the present disclosure.
Figure 7:
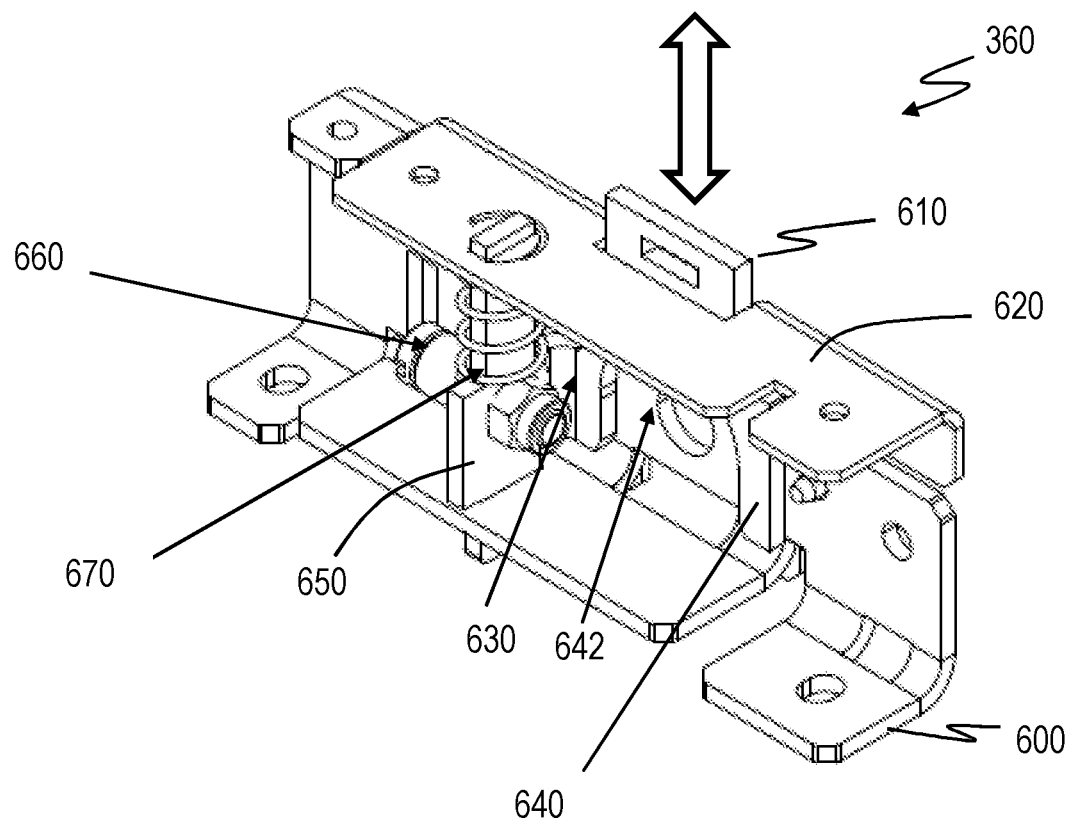

FIGS. 6 and 7 illustrate an exploded view and an assembled view, respectively, of the locker assembly 360, which prevents a racking operation unless the push-button operator assembly 302 has been operated to disengage the locker assembly 360 from the racking operator. As shown, the locker assembly 360 includes a bottom support 600 (e.g., a base), a top support 620 and a locker 630 which is arranged between the supports 600 and 620. The locker 630 includes a gear lock 640 and a guide 650, which in this example is perpendicular to the gear lock 640. The guide 650 supports the gear lock 640, and includes a top end 652 and an opposite bottom end 654. The guide 650 also includes an opening 656 for mounting a bushing 660 (carrying a tube 662) using a nut 664, which is connected to an end of the bushing 660. The bushing 660 extends perpendicularly from the guide 650. A spring 670 is carried on the top end 652 of the guide 650.

The bottom support 600 includes a plurality of openings 602, 604, 606 and 608. The openings 602 and 604 are for respective prongs 580 and 590 of the fork 550 (see, e.g., FIGS. 5A-5C). The opening 608 is provided for the internal rod assembly 320 (in FIG. 3). The top support 620 includes a plurality of openings 622 and 624. A top portion 644 of the gear lock 640 extends through the opening 624 of the top support 620. The locker 630 is movably connected between the bottom support 600 and the top support 620, with the top end 652 of the guide 650 arranged in the opening 622 and the bottom end 654 arranged in the opening 606. The spring 670 applies a biasing force to move the locker 630 and its gear lock 640 downwards into a locked position. The bottom support 600 is connected to the top support 620 using screws 612, which are connected in holes 610.

In the locked position, the teeth 642 of the gear lock 640 is to be engaged to a gear (e.g., 830 in FIG. 8 discussed below) of the internal rod assembly 320 to prevent operation of the racking operator. In general, to disengage the locker 630 from the racking operator, the push-button operator assembly 302 is pushed inwards by depressing the push-button 532, which in turn raises the bushing 660 via the fork 550, and thus, the gear lock 640 into the unlocked position. In the unlocked position, the gear can rotate freely.

Figure 8:
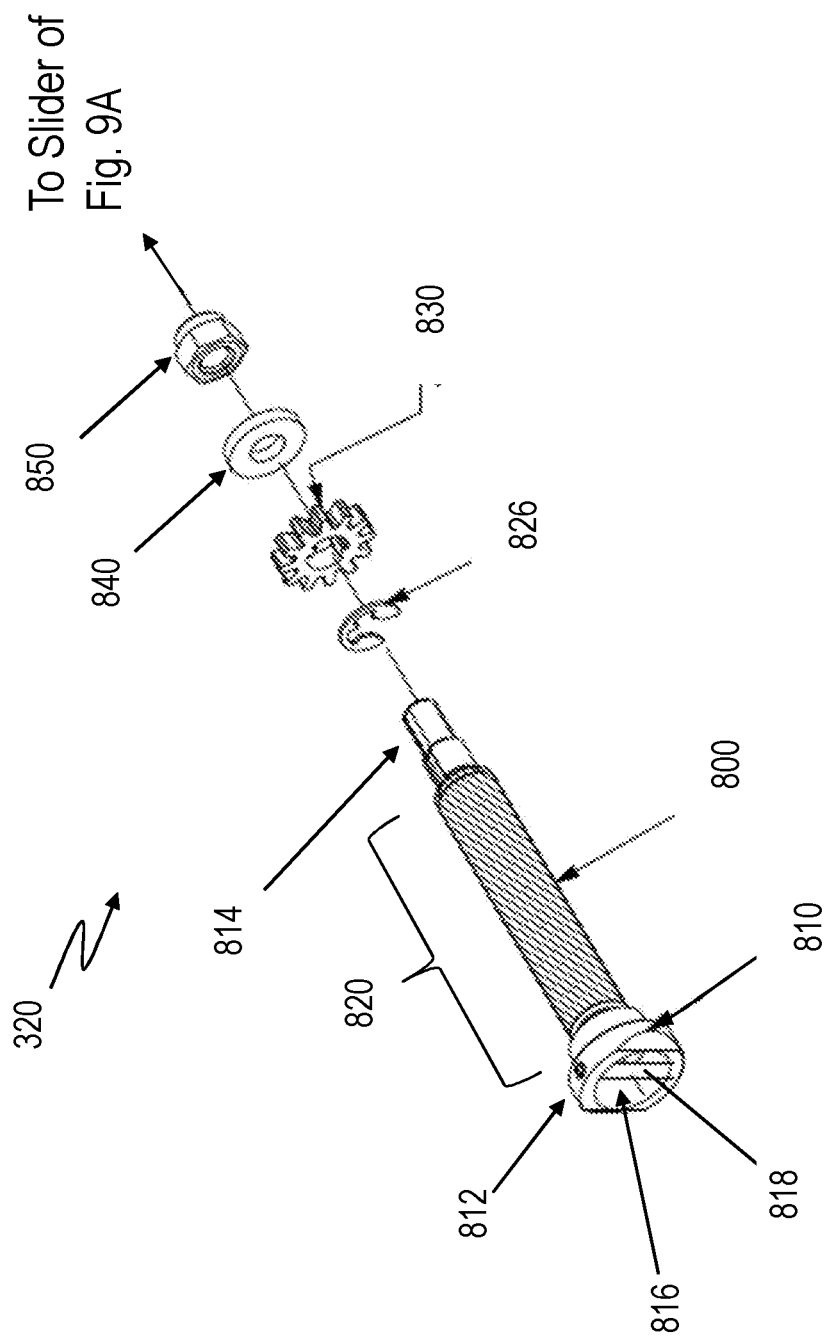
FIG. 8 illustrates an exploded view of an internal rod assembly, such as a lead screw, of a racking operator of the racking device of FIGS. 1-4, in accordance with an example embodiment of the present disclosure.

FIG. 8 illustrates an exploded view of an internal rod assembly 320 of the racking operator of the racking device 110. The internal rod assembly 320 interconnects the external rod assembly 304 and the slider assembly 350 of the racking operator, as shown in FIG. 3. In FIG. 8, the internal rod assembly 320 includes a tapering and threaded internal rod 800 (e.g., a lead screw), a washer lock 826, a gear 830, a washer 840 and a nut 850. The internal rod 800 includes a first end 812, a second end 814 opposite the first end 812, and a threaded portion 820 between the two ends 812 and 814. The first end 812 includes a bore 816 with a pin 818. The pin 818 is configured to engage and mate with a slot at an end of the external rod 576 (in FIG. 5A) when the external rod 576 is pressed inwards by a tool for operating the racking operator.

The internal rod 800 tapers from the first end 812 to the second end 814. The washer lock 826, the gear 830, and the washer 840 are arranged on the second end 814 of the internal rod 800 and secured by the nut 850. The gear 830 is fixed on the internal rod 800. As previously discussed, the gear lock 640 of the locker 630 (in FIG. 6) engages the gear 830 in the locked position to prevent the operation of the internal rod assembly 320 of the racking operator. In the unlocked position, the gear lock 640 of the locker 630 is disengaged from the gear 830 to allow the gear 830 to rotate freely, thereby allowing operation of the internal rod assembly 320.

Figure 9A:
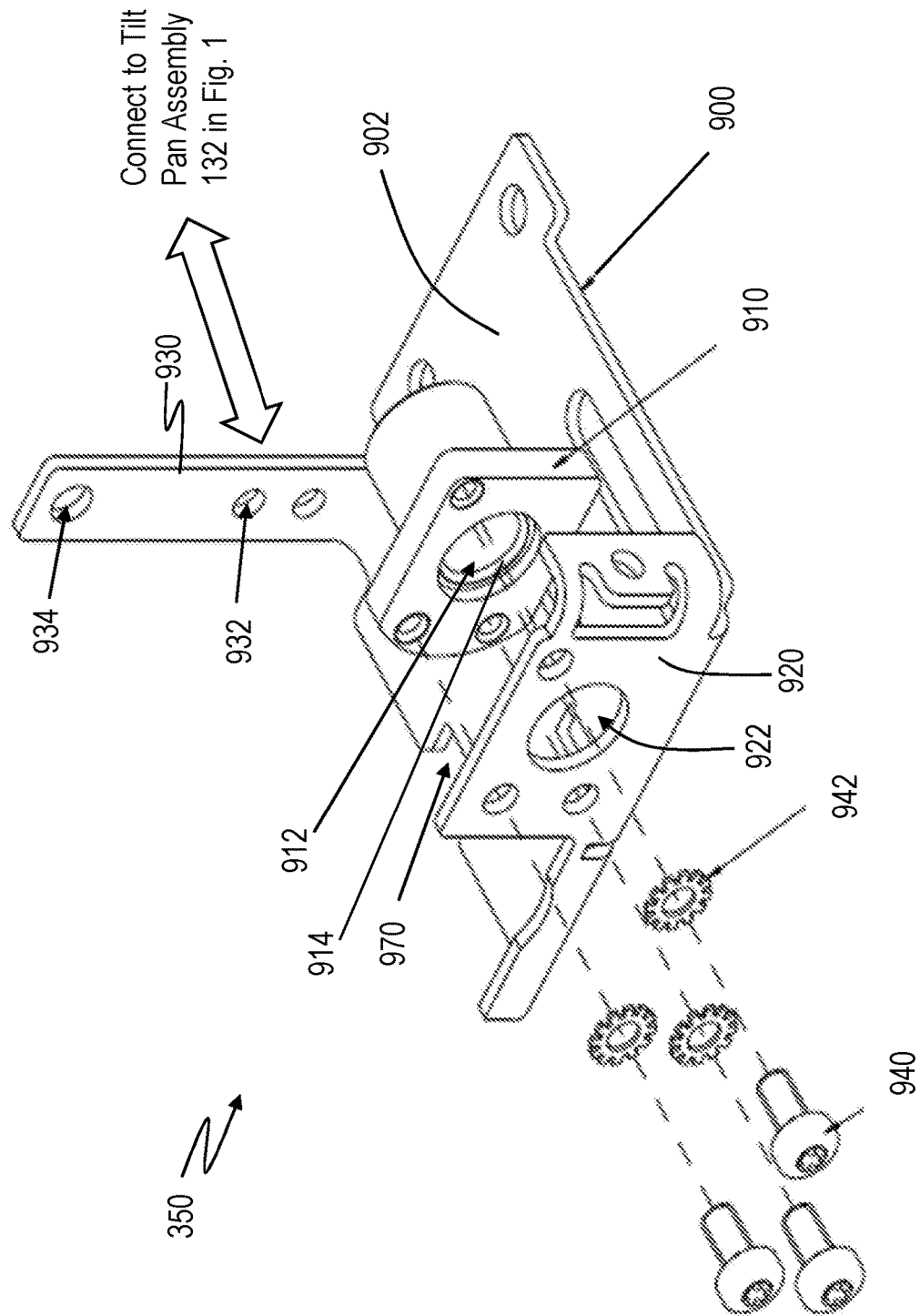
FIG. 9A illustrates an exploded view of a portion of a slider assembly of the racking device of FIGS. 1-4, in accordance with an example embodiment of the present disclosure.
Figure 9B:
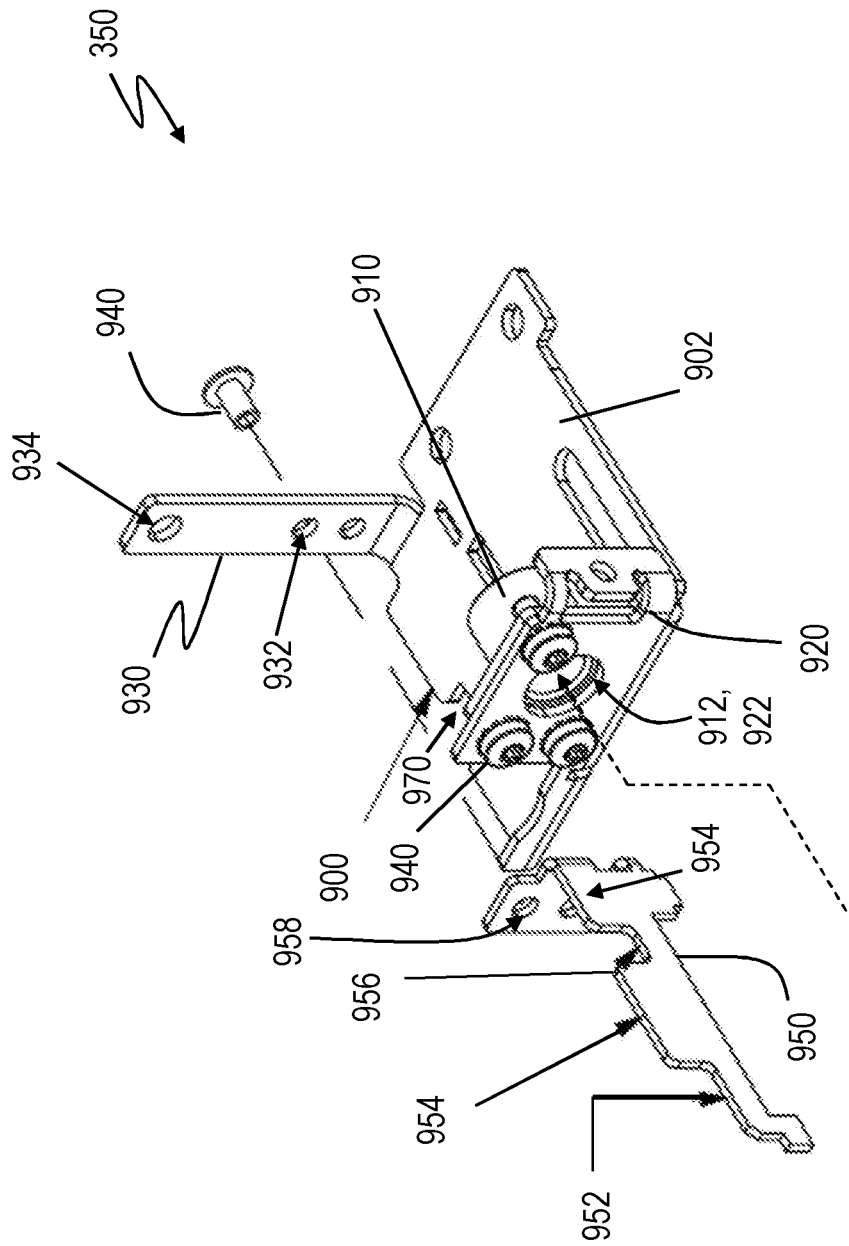
FIG. 9B illustrates an exploded view of a portion of the slider assembly of the racking device of FIGS. 1-4, including an indexer, in accordance with an example embodiment of the present disclosure.

As shown in FIGS. 9A and 9B, the slider assembly 350 of the racking operator of the racking device 110 includes a slider 900, a barrel 910 and an indexer 950 (in FIG. 9B). The barrel 910 includes a bore 912 extending therethrough with threads 914. The slider 900 includes a base support plate 902 with a vertical front support plate 920 for the barrel 910 connected thereto using screws 940 and washers 942. The vertical front support plate 920 also includes an opening 922, which is aligned with the threaded bore 912 of the barrel 910. The slider 900 also includes a vertical back support plate 930 for securing the indexer 950 to the slider 900 with screw(s) 940 engaged in hole(s) 932 of the slider 900 and holes 958 of the indexer 950. The vertical back support plate 930 of the slider 900 is also connectable to the tilt pan assembly 132 of the support assembly 130 for the circuit breaker 140 (in FIG. 1) using screw(s) 940 via the holes 932. The slider 900 also includes a stop notch 970, which is configured to receive a blocking pin 1516 of the handle interlock assembly 112 (of FIG. 1) in the locked position, when the operator handle 230 is in the ON position and the circuit breaker 140 is racked-in in the connected position. In general, in the locked position, the handle interlock assembly 112 (in FIGS. 1, 15A and 15B) prevents operation of the racking operator, particularly the slider 900 and blocks the fork 550 (e.g., the second prong 590) of the push-button operator assembly 302 from moving to the depressed position. When the operator handle 230 (in FIG. 2) is in the OFF state, the blocking pin 1516 (in FIGS. 15A and 15B) is disengaged from the stop notch 970 in an unlocked position to allow operation of the slider 900 of the racking operator. The handle interlock assembly 112 and its blocking pin 1516 are described in greater detail below with reference to FIGS. 15A and 15B.

The indexer 950 extends along a side of the slider assembly 350, and includes a plurality of spaced-apart slots along its length. Each of the slots corresponds to a position of the racking operator, such as a disconnected position and a connected position for a two-position racking device 110. In this example, the indexer 950 includes a first slot 952 for a connected position and a second slot 956 for a disconnected position. The slots 952 and 956 (e.g., slot, cavity, notch, etc.) are separated by a raised segment(s) 954, and configured to receive the bushing 660 of the locker 630 of the locker assembly 360 (in FIGS. 3, 6 and 7). The distance between the slots 952 and 956 is configured according to the travel distance of the slider 900, which is required to rack-in or rack-out the electrical stabs of the circuit breaker 140.

Figure 10:
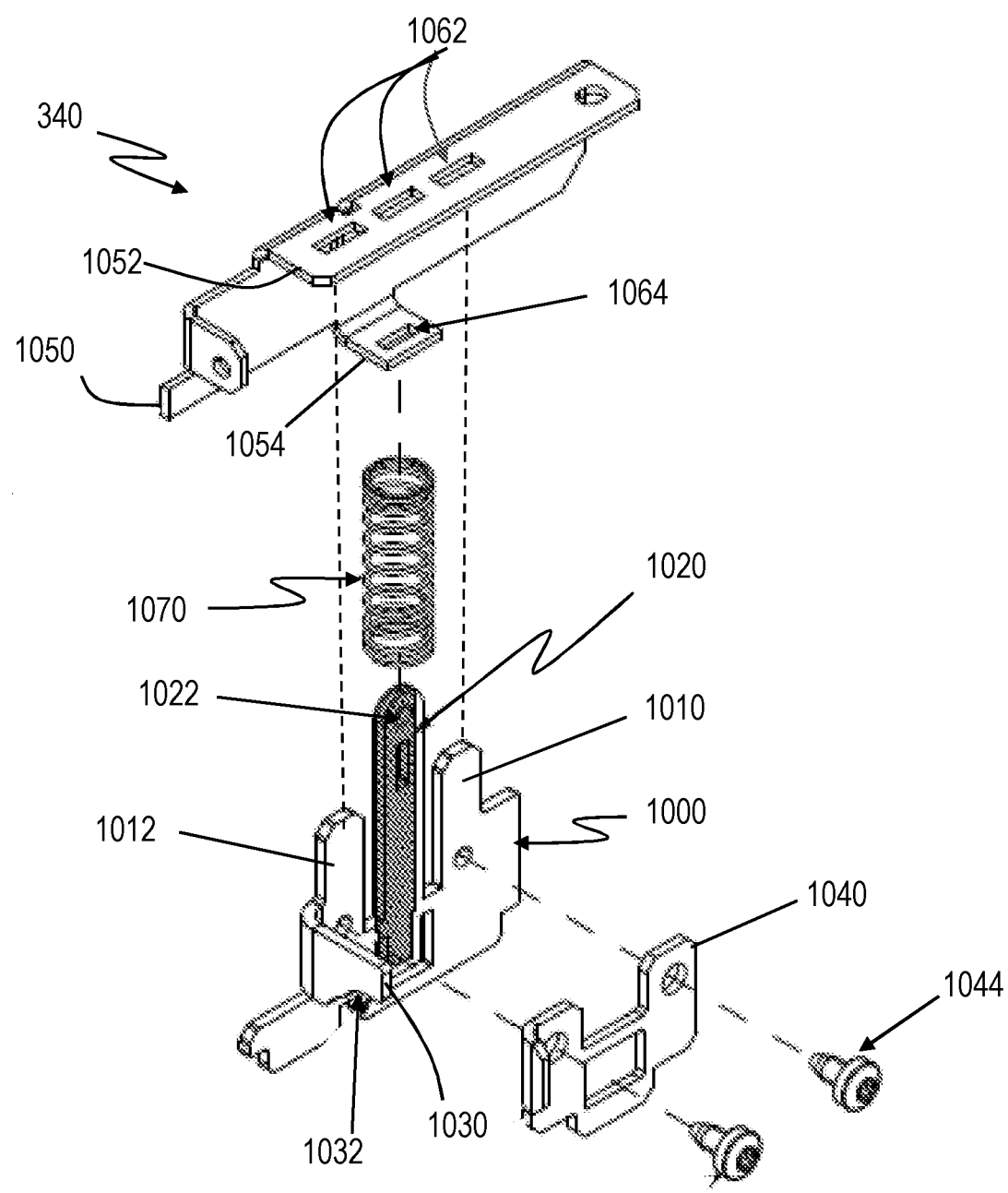
FIGS. 10 and 11 illustrate an exploded view and an assembled view, respectively, of a door interlock assembly of the racking device of FIGS. 1-4, in accordance with an example embodiment of the present disclosure.
Figure 11:
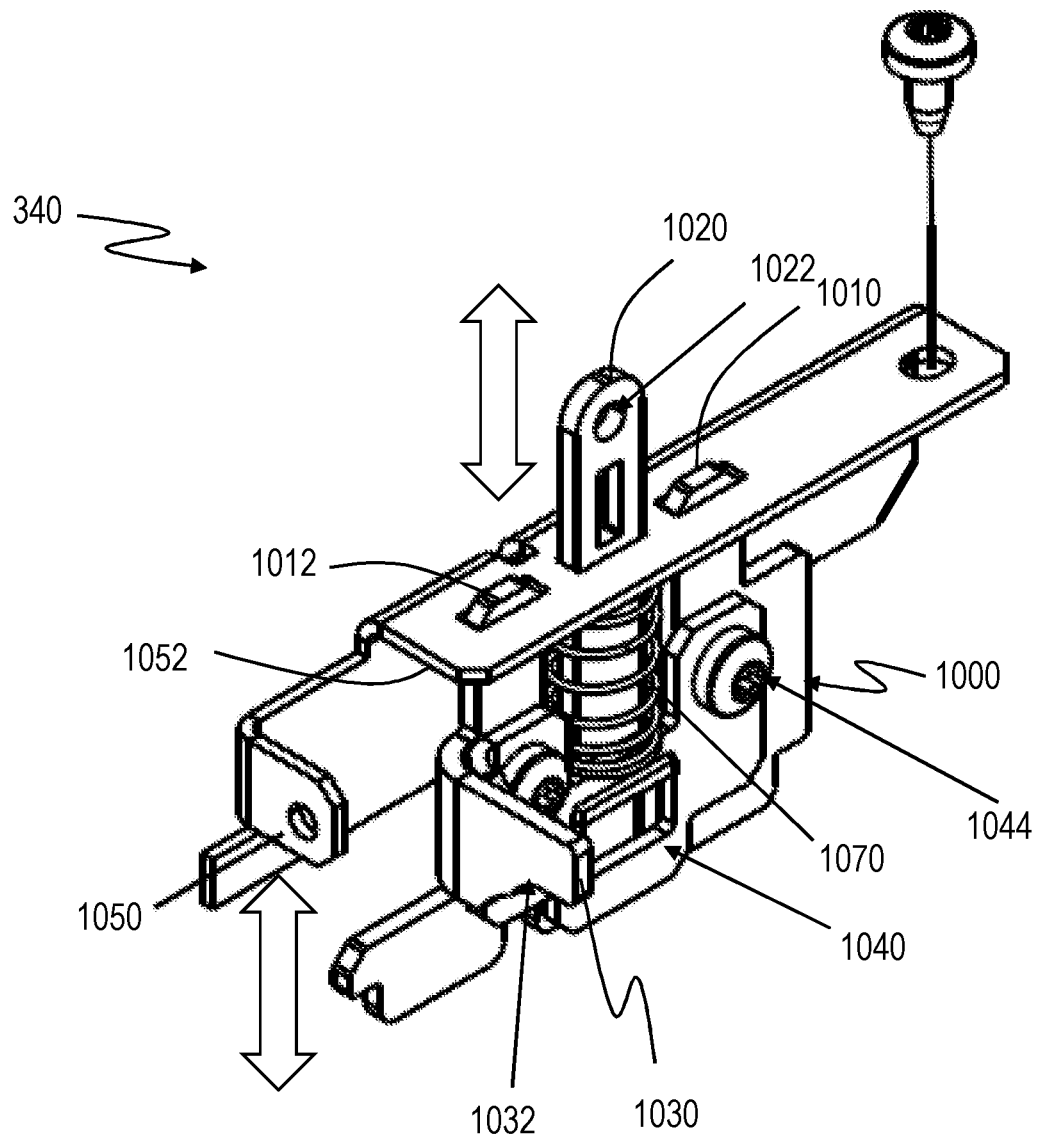

FIGS. 10 and 11 illustrate an exploded view and an assembled view, respectively, of a door interlock assembly 340 of the racking device 110. The door interlock assembly 340 prevents the operation of the components of the push-button operator assembly 302, when the door of the unit 10 is open. The door interlock assembly 340 includes a push-button locker 1000, a spring support bracket 1040 connected to the locker 1000 using screws 1044, and a support 1050 for the locker 1000. The push-button locker 1000 includes three fingers 1010, 1012 and 1020, and a stop bracket 1030 connected perpendicularly to a side of the finger 1012. The finger 1020 is in between and longer than the fingers 1010 and 1012, and includes an opening 1022 at an open end (e.g., a tip). A spring 1070 is arranged on the finger 1020.

The support 1050 is arranged on a side of the racking device 110, and includes a top portion 1052 and a bottom portion 1054 which are parallel to one another. The top portion 1052 includes three slots 1062; and the bottom portion 1054 includes a slot 1064 which is aligned with the middle one of the slots 1062. The three fingers 1010, 1012 and 1020 are engaged to corresponding slots 1062 of the top portion 1052, with the middle one of the fingers, 1020, also extending through the slot 1054 of the bottom portion 1054. The spring 1070 applies a biasing force to move the push-button locker 1000 away from the support 1050.

Figures 12A, 12B:
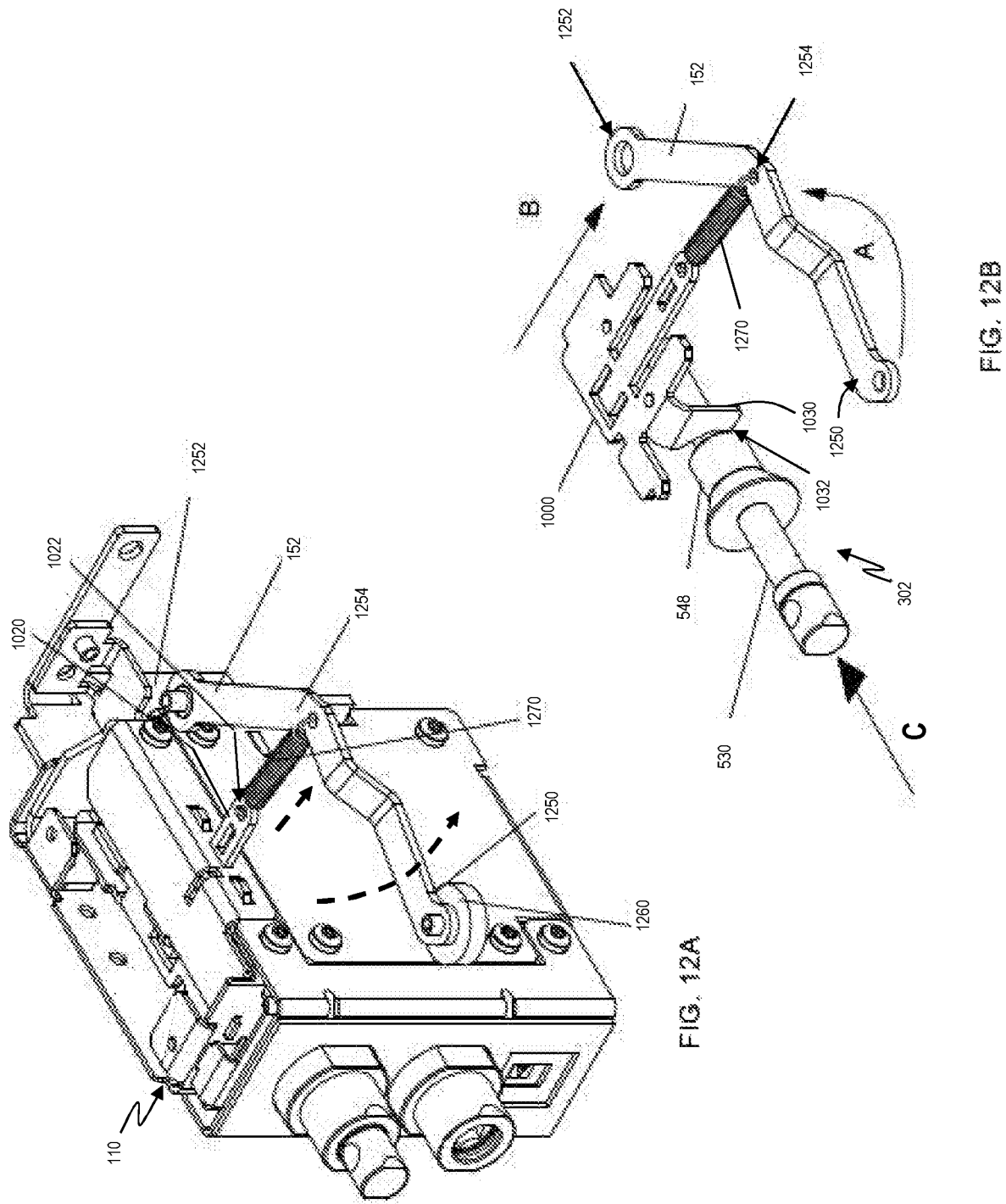
FIGS. 12A and 12B illustrate the door interlock assembly of the racking device of FIGS. 1-4, which is controlled by a lever that pivots to reflect a state of the door of the unit, such as open or closed, in accordance with an example embodiment of the present disclosure.

As further shown in FIGS. 12A and 12B, the middle finger 1020 of the door interlock assembly 340 is connected to one end of a spring 1270 via the opening 1022. The other end of the spring 1270 is connected to the lever 152 via an opening 1254. The lever 152 includes a first end 1250 (e.g., a free end) and an opposite second end 1252 about which the lever 152 pivots. A rubber bumper 1260 or the like is connected to the first end 1250 of the lever 152. In operation, when the door of the unit, such as for example the unit 10 in FIG. 1, is open, the push-button locker 1000 is in the locked position, such as shown in FIG. 12B, with the stop bracket 1030 of the push-button locker abutting or blocking the barrel 548. In the locked position, the push-button locker 1000 prevents operation of the push button operator assembly 302. When the door of the unit 10 is closed, the door pushes against the bumper 1260, which in turn causes the lever 152 to pivot outwards (e.g., step A). As the lever 152 pivots outwards (e.g., over travels), the spring 1270 is stretched, which in turn pulls the push-button locker 1000 into the unlocked position (e.g., step B). In the unlocked position, the stop bracket 1030 is no longer abutting or blocking the barrel 548 or other components of the push-button operator assembly 302, thereby allowing closed door operation of the push-button operator assembly 302 (e.g., step C).

Figure 14:
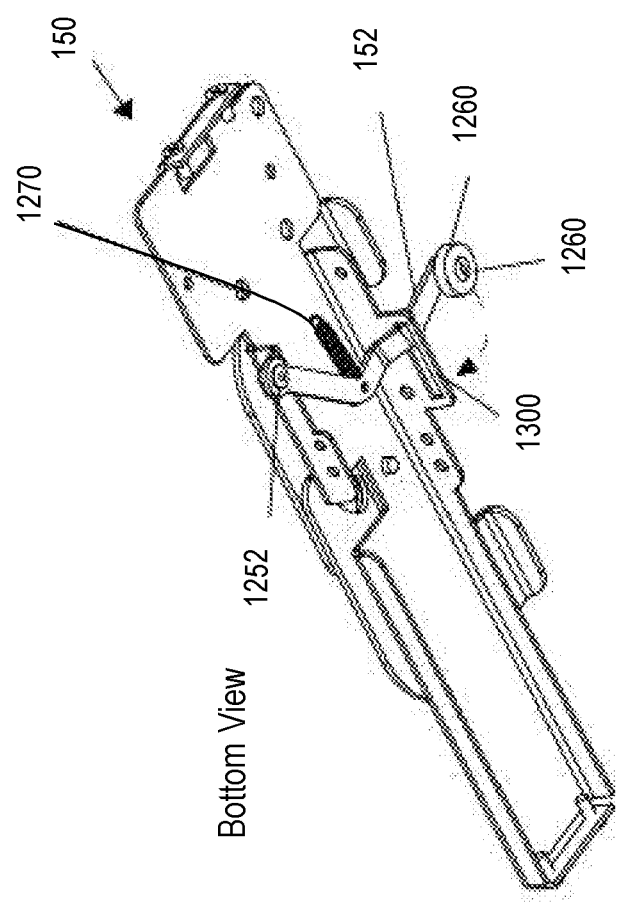
FIGS. 13 and 14 illustrate a top view and a bottom view of a handle insertion assembly with the lever for the unit of FIGS. 1-4, in accordance with an example embodiment of the present disclosure.
Figure 13:
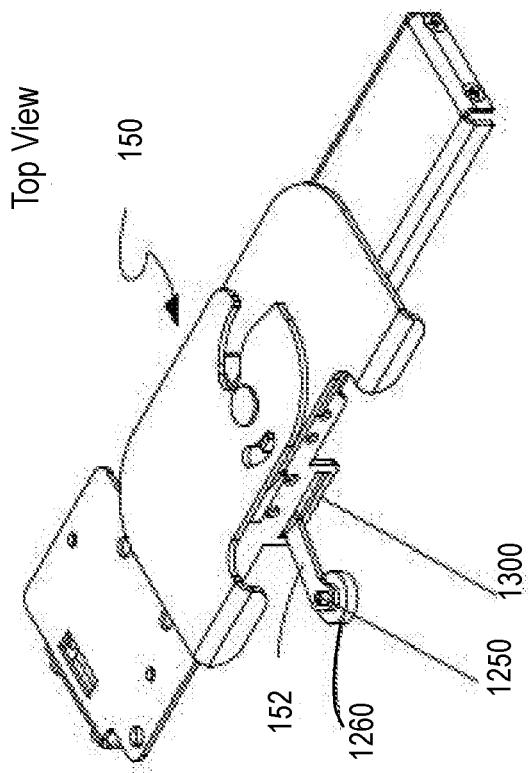

FIGS. 13 and 14 illustrate a top view and a bottom view of the handle insertion assembly 150, which carries the lever 152 in the unit of FIG. 1. As shown in FIG. 14, the second end 1252 of the lever 152 is connected to a bottom of a body (e.g., support) of the handle insertion assembly 150, and the lever 152 pivots about the second end 1252. A slot 1300 is provided to support and control a range of motion of the lever 152, when the door to the unit 10 is opened or closed.

Figure 15A:
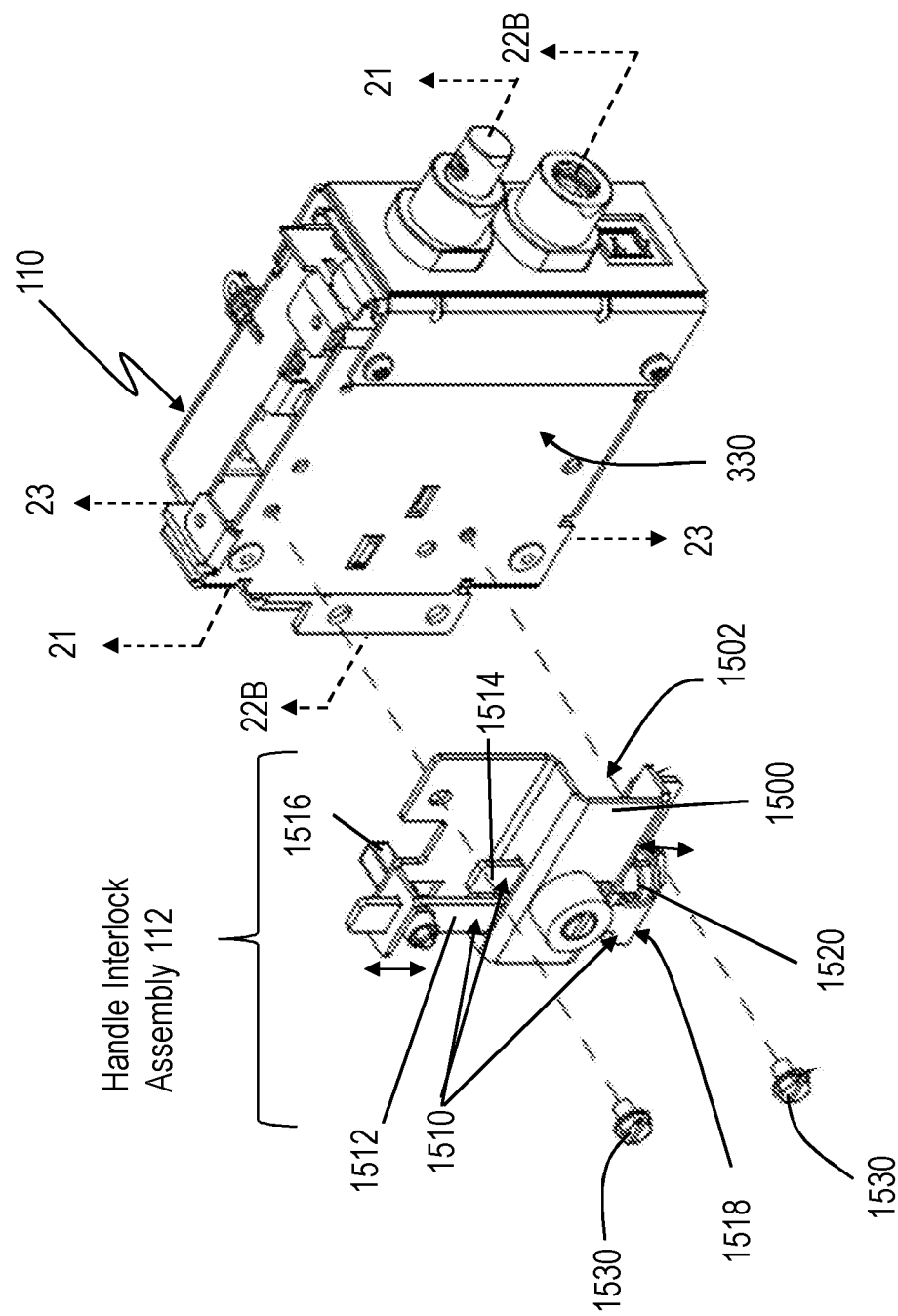
FIGS. 15A and 15B illustrate an exploded view and an assembled view, respectively, of an operator handle interlock assembly of the racking device of FIGS. 1-4, in accordance with an example embodiment of the present disclosure.
Figure 15B:
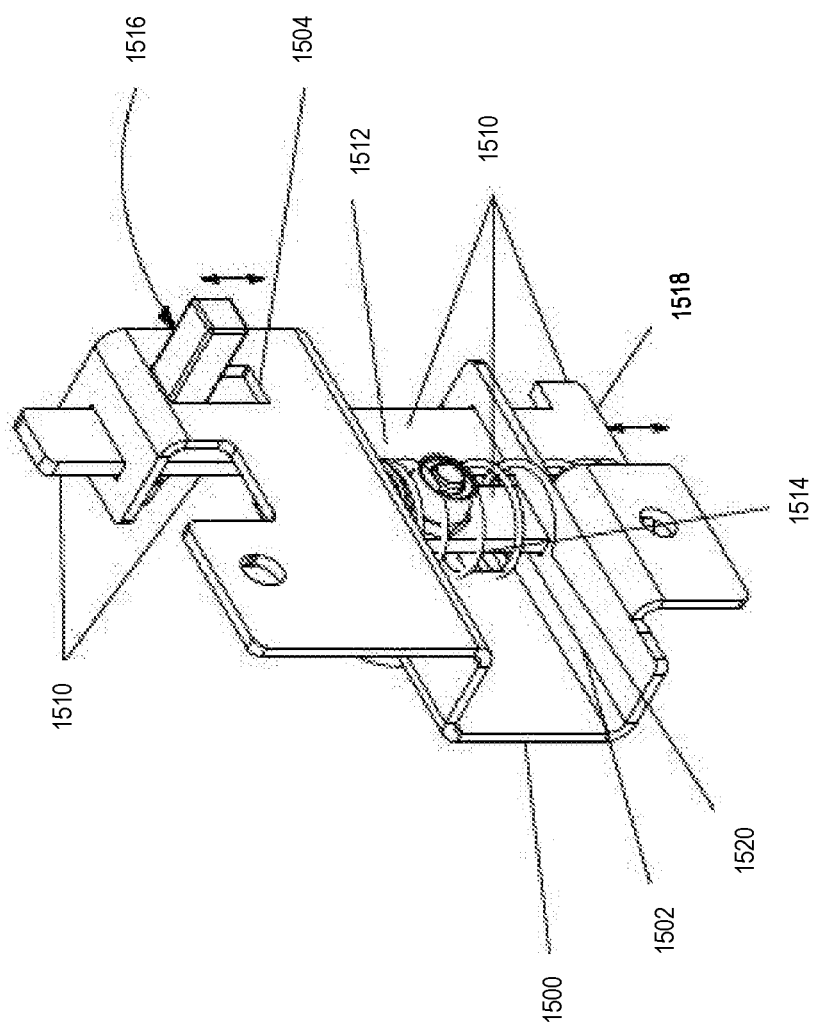

FIGS. 15A and 15B illustrate an exploded view and an assembled view, respectively, of an operator handle interlock assembly 112 of the racking device 110. The handle interlock assembly 112 is connected to the support assembly 330 using screws 1530. The handle interlock assembly 112 includes a U-shaped support 1500 having an extending groove 1502, a locker 1510 having two fingers 1512 and 1514, and a spring 1520. The fingers 1512 and 1514 extend through opposing walls defining the groove 1502, as well as the groove 1502. The finger 1512 is longer than the finger 1514, and has a blocking pin 1516 connected to a free end of the finger 1512. The blocking pin 1516 extends perpendicularly from the finger 1512. The spring 1520 is arranged on the finger 1514, and provides a biasing force to lower the fingers 1512 and 1514, and thus, the blocking pin 1516 relative to the support 1500.

Figure 15C:
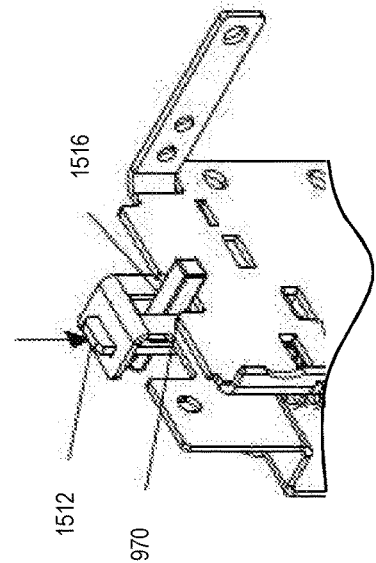
FIGS. 15C and 15D illustrate the operator handle interlock assembly in the unlocked position when the operator handle is in the OFF position, in accordance with an example embodiment of the present disclosure.
Figure 15E:
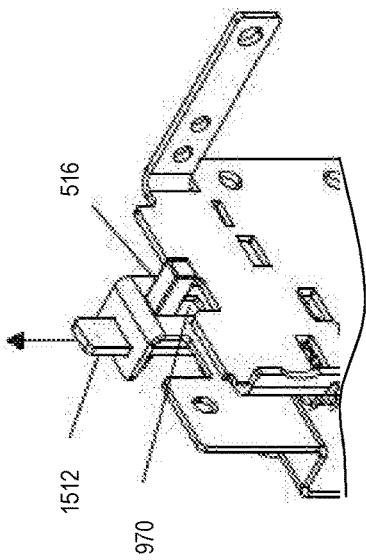
FIGS. 15E and 15F illustrate the operator handle interlock assembly in the locked position when the operator handle is in the ON position, in accordance with an example embodiment of the present disclosure.
Figure 15D:
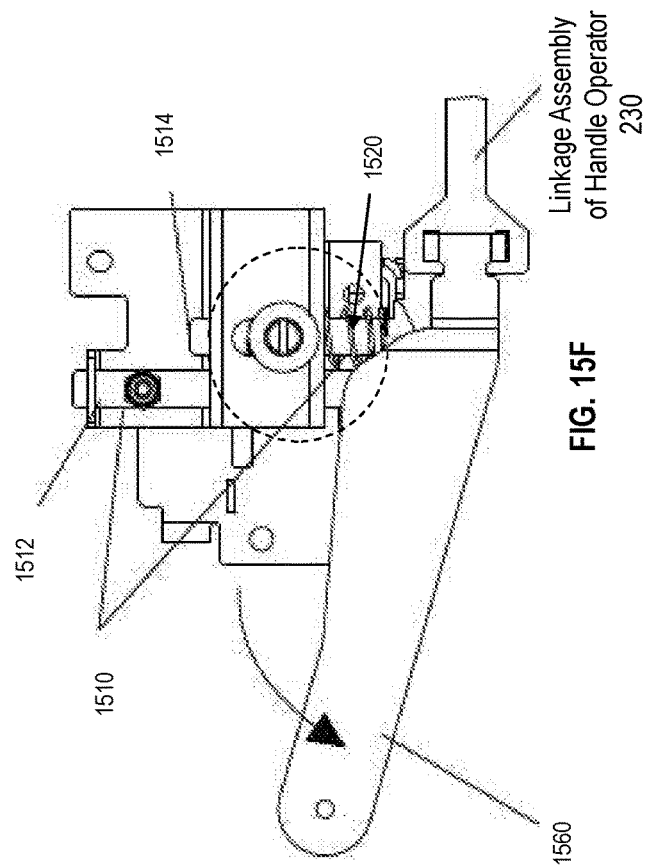
Figure 15F:
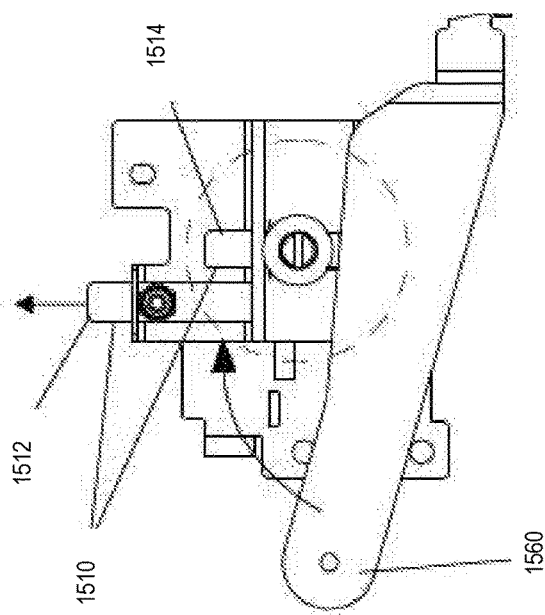

In operation, when the bail arm assembly 200 is operated by the operator handle 230 to the ON position which turns ON the circuit breaker 140, a toggle arm 1560 of the bail arm assembly 200 moves backwards and down, which in turn releases pressure against a bottom portion 1518 of the locker 1510 into a locked position as shown in FIGS. 15E and 15F. In the locked position, the blocking pin 1516 is received in the stop notch 970 of the slider 900 of the racking operator, and thus prevents operation of the components of the racking operator, particularly the slider 900 (and blocks the fork 550 (e.g., the second prong 590) of the push-button operator assembly 302 from moving to the depressed position). In this example, the slider 900 is in the connected position. As shown in FIGS. 15C and 15D, when the operator handle 230 is moved to the OFF position, the toggle arm 1560 of the bail arm assembly 200 moves forward and up, and presses against the bottom portion 1518 of the locker 1510, which in turn raises the locker 1510 and the blocking pin 1516 into the unlocked position. In the unlocked position, the blocking pin 1516 is disengaged from the stop notch 970 of the slider 900 to allow operation of the slider 900 of the racking operator.

Figure 16A:
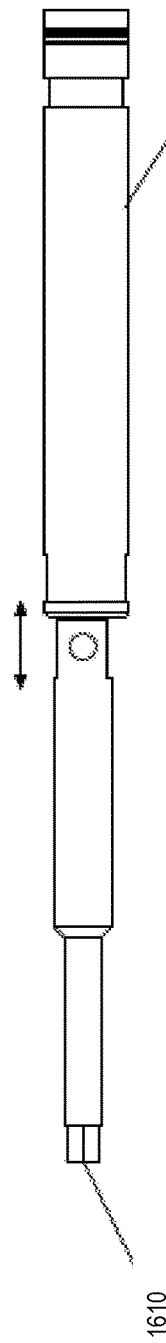
FIGS. 16A and 16B illustrate an example of an expandable tool for operating the racking device of FIGS. 1-4 to rack-in or rack-out the circuit breaker, in accordance with an example embodiment of the present disclosure.
Figure 16B:
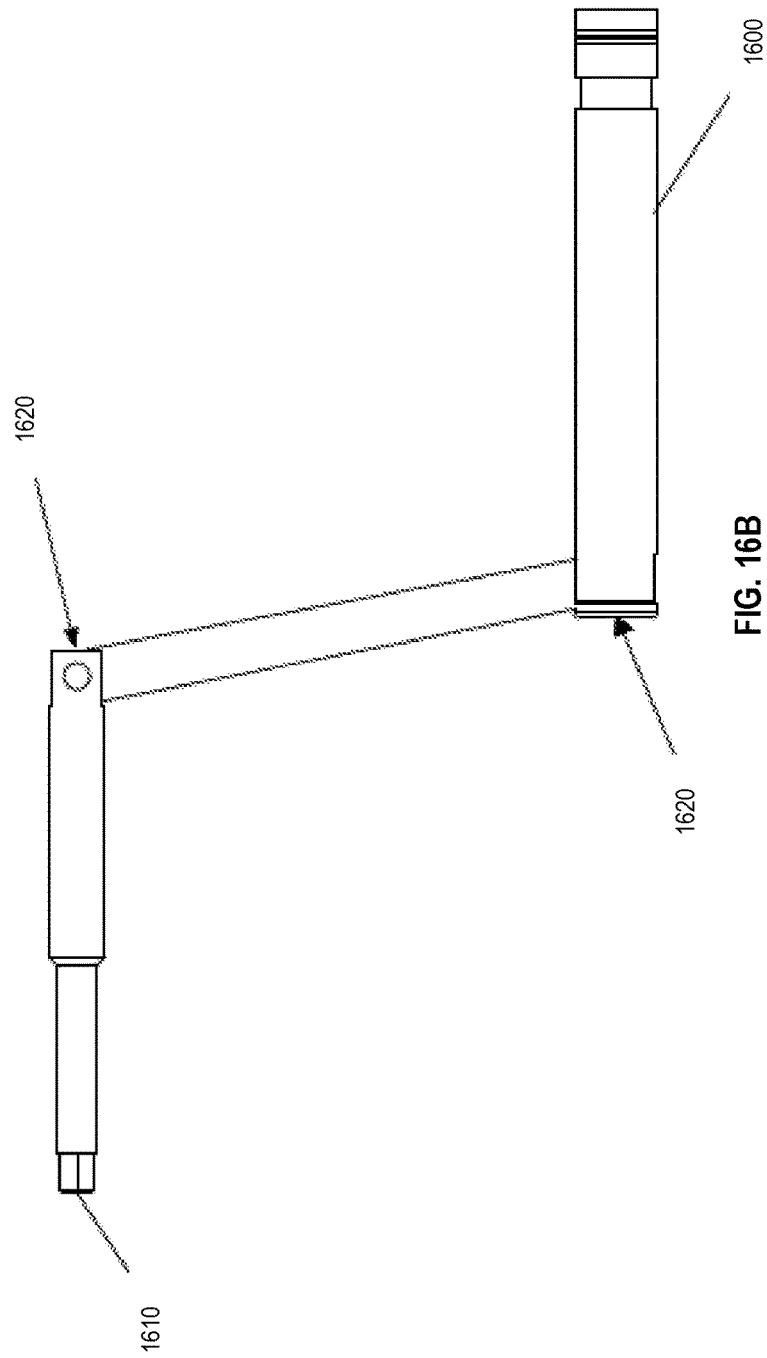

FIGS. 16A and 16B illustrate an example of a tool 1600 for operating the components of the racking device 110 between different positions, such as the connected position and the disconnected position. The tool 1600 has a tip 1610 which is configured with a size and shape to engage the external rod 576 of the racking operator, and operate the racking operator. In this example, the tool 1600 has three parts, with joints 1620 which can be pivoted to change the configuration of the tool 1600 (e.g., crank tool, etc.), to facilitate operation of the racking operator of the racking device 110.

Figure 17:
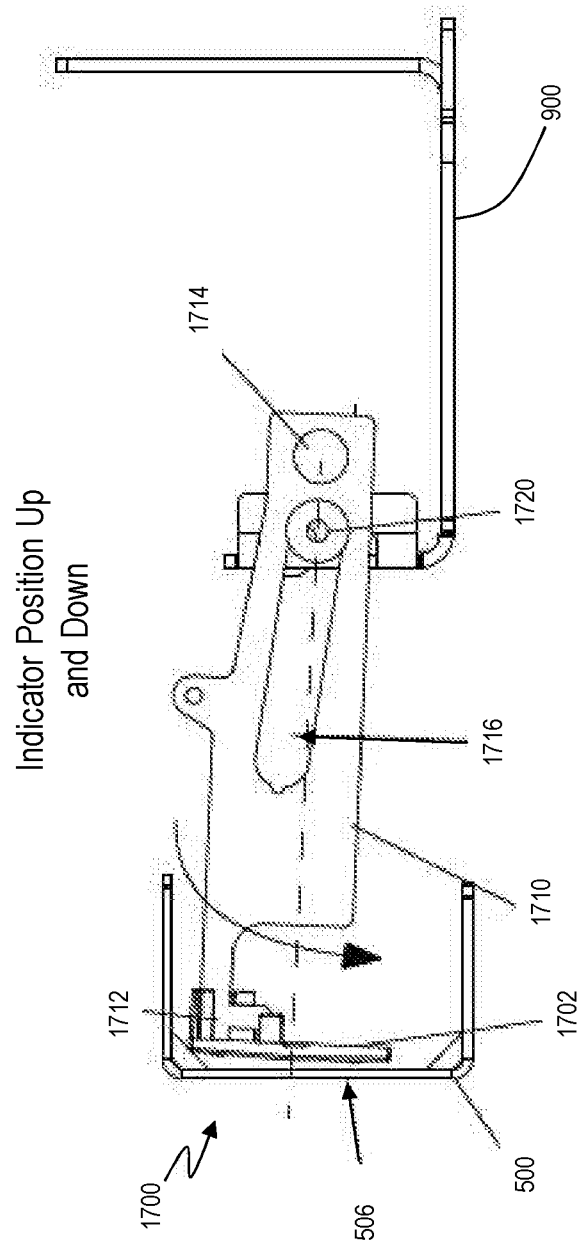
FIG. 17 illustrates components of an indicator assembly of the racking device of FIGS. 1-4, in accordance with an example embodiment of the present disclosure.

FIG. 17 illustrates components of an indicator assembly 1700 of the racking device 110 of FIGS. 1-4. The indicator assembly 1700 includes a status indicator 1702, an indicator arm 1710, and a bushing 1720 connected to the slider 900 of the racking operator. In this example, the status indicator 1702 includes two different visual indications corresponding to the racked-in position and the racked-out position. The indicator arm 1710 has a first end 1712 and an opposite second end 1714, which is connected to the housing 120 of the racking device 110 and about which the indicator arm 1710 pivots. The indicator arm 1710 includes a guide slot 1716 extending along a length of the arm 1710, and in which a portion of the bushing 1720 is arranged to slide. As shown in FIGS. 17 and 18, when the slider 900 of the racking device 110 is in the disconnected position, the indicator arm 1710 is pivoted to a down position, with the disconnected indication (e.g., Green) of the status indicator 1702 being displayed through the openings 506 and 516 (e.g., a window) of the back support plate 500 and the front support plate, respectively. As shown in FIGS. 17 and 19, when the slider 900 of the racking device 110 is in the connected position, the indicator arm 1710 is pivoted to an up position by the bushing 1720, with the connected indication (e.g., Red) of the status indicator 1702 being displayed through the openings 506 and 516 of the back support plate 500 and the front support plate, respectively. In this example, the slider 900 is configured to travel 35 mm from the disconnected position to the connected position. Another view of the status indicator 1702 is shown in FIGS. 24A and 24B.

Figure 20:
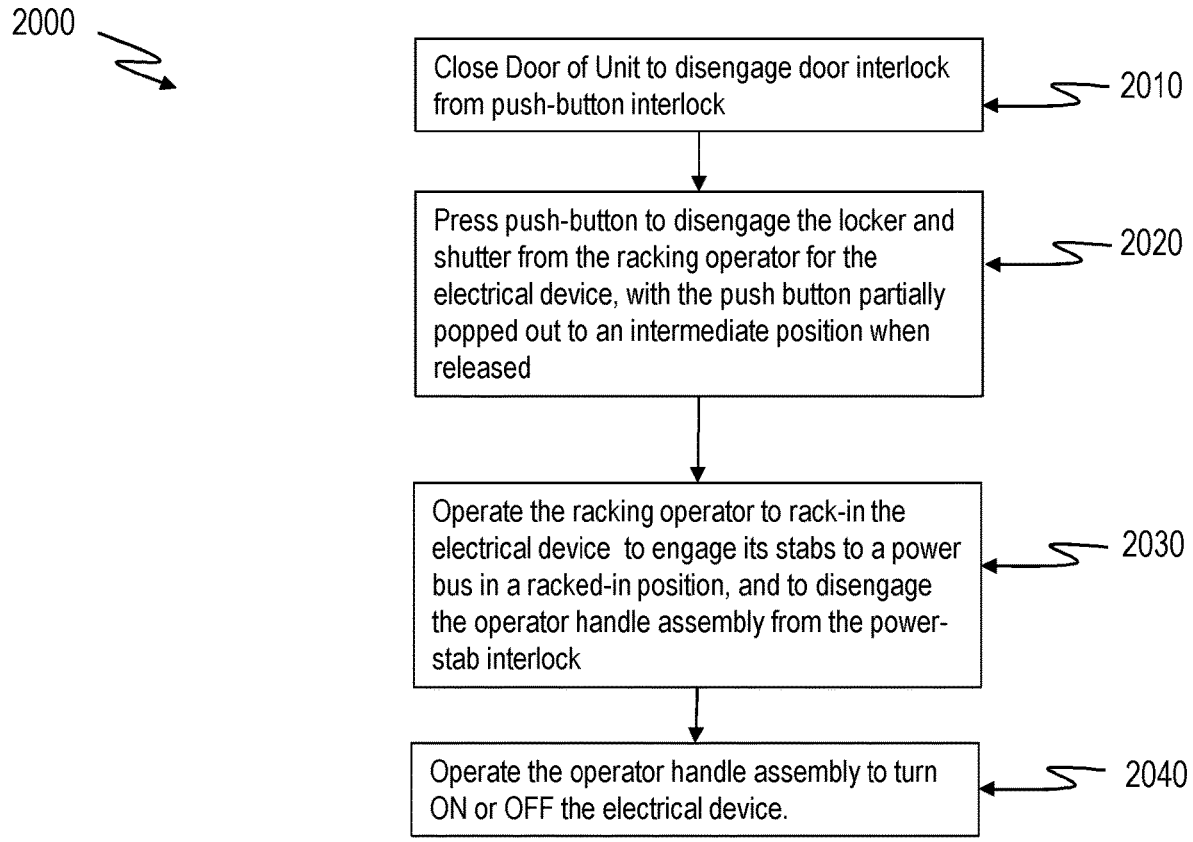
FIG. 20 illustrates an example process by which the components of the unit, including the racking device, of FIGS. 1-4 can be operated to rack-in or rack-out the circuit breaker, in accordance with an example embodiment of the present disclosure.

FIG. 20 illustrates an example process 2000 by which the components of the unit 10, including the racking device 110, of FIGS. 1-8 can be operated to rack-in or rack-out the circuit breaker 140, when the door of the unit 10 is closed. At reference 2010, the user closes the door of the unit 10 to disengage the door interlock assembly 340 from the push button interlock assembly (e.g., the push-button operator assembly 302). At reference 2020, the user pushes the push button 532 of the push-button operator assembly 302 to disengage the push-button interlocks (e.g., the shutter 310, and the locker 630) from the components of the racking operator (e.g., the external rod 576 and the internal rod 800). At this stage, when the push-button 532 is released (e.g., no longer being pushed), the push-button 532 (of the push-button operator assembly 302) can be fully or partially inside of the push-button cover 542 with the push-button indicator 536 hidden from view in the cover 542. At reference 2030, in the intermediate position, the user can then operate the racking operator, manually or automatically using a tool, to rack-in the circuit breaker 140 to the connected position. In the connected position, the stabs of the circuit breaker 140 are connected to the power bus, and the power-stab interlock (e.g., the catch bracket 210) is disengaged to allow operation of the operator handle 230.

At reference 2040, the user can operate the operator handle 230 to an ON position to turn ON the circuit breaker 140 or to an OFF position to turn OFF the circuit breaker 140.

EXAMPLE OPERATION

The operation of the push-button interlock assembly and the racking operator for a closed door operation will be described with reference to the figures. The door of the unit 10 is closed to disengage the door interlock assembly 340 from the push-button operator assembly 302. For example, as shown in FIG. 21, the finger 1020 of the locker 1000 is pulled outwards when the door is closed, which in turn lifts the stop bracket 1030 so that the stop bracket 1030 is no longer abutting or blocking the barrel 548 of the push-button operator assembly 302. With the stop bracket 1030 cleared, the push-button operator assembly 302 can now be operated by a user.

In operation, the push-button operator assembly 302 (in FIG. 3) can be pressed inwards (e.g., depressed) via the push-button 532 (in FIGS. 5A and 5B) to begin the sequence of operations to disengage the push-button interlocks (e.g., the shutter 310 and the locker 630) in order to allow operation of the components of the racking operator (e.g., the external rod 576, and the internal rod 800). For the purposes of explanation, the components of the racking operator, such as the slider assembly 350, are initially in the disconnected position, with the bushing 660 of the locker 630 seated in the second slot 956 of the indexer 950 of the slider assembly 350. The shutter 310 and the locker 630, which are both spring-biased, are both in the locked position to prevent operation of the external rod 576 and the internal rod 800 of the racking operator.

Figure 22B:
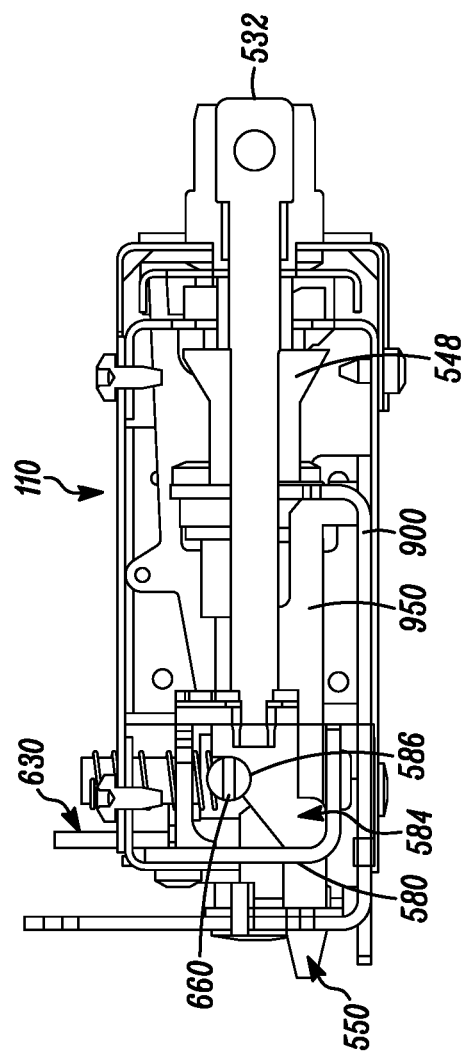
FIG. 22B illustrates a cross-sectional view of the racking device of FIG. 15A along the section B-B, which shows the operation of a fork of a push-button operator assembly when the push-button is in the depressed position, in accordance with an example embodiment of the present disclosure.
Figure 23:
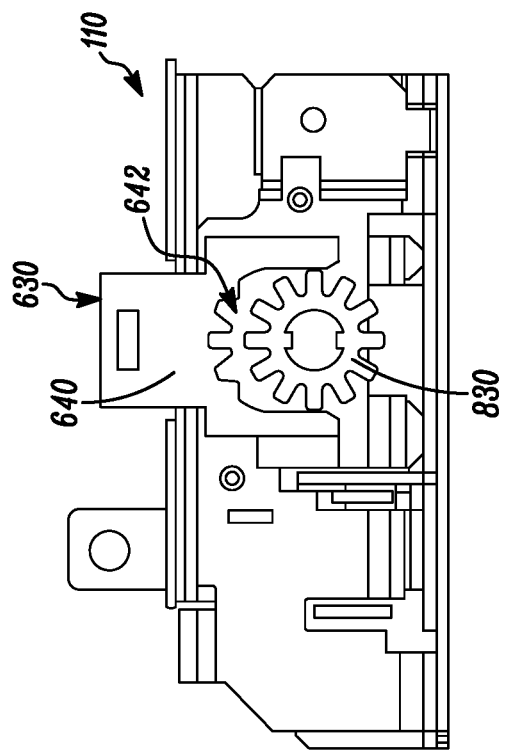
FIG. 23 illustrates a cross-sectional view of the racking device of FIG. 15A along the section C-C, which shows the operation of a locker assembly of a push-button interlock assembly when the push-button is in the depressed position, in accordance with an example embodiment of the present disclosure.
Figure 22A:
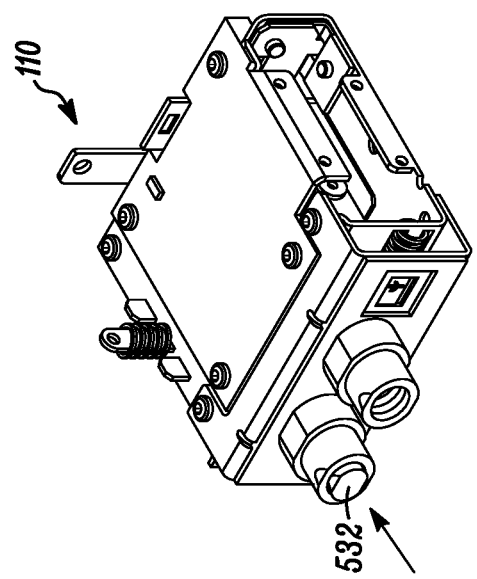
FIG. 22A illustrates the push-button of the racking device of FIGS. 1-4 in a depressed position, in accordance with an example embodiment of the present disclosure.

The push-button 532 is initially depressed into a depressed position to start the operations for disengaging the push-button interlock assembly, such as shown in FIG. 22A. When the push-button 532 is pressed, the fork 550 of the push-button operator assembly 302 is moved towards the back of the racking device 110, and picks up the bushing 660 from the second slot 956 of the indexer 950 using the first prong 580 of the fork 550. For example, the bushing 660 rides along the ramp 584 and falls into the catch 586 of the first prong 580 as shown in FIG. 22B, which lifts the bushing 660 of the locker 630 and the other components of the locker 630, particularly the gear lock 640 as shown in FIG. 23. As a result, the raised gear lock 640 and its teeth 642 are disengaged from the gear 830 of the internal rod assembly 320 of the racking operator into the unlocked position, with sufficient clearance provided between the gear lock 640 and the gear 830. At this point, the push-button operator assembly 302 is automatically held in the depressed position by the bushing 660 sitting in the catch 586 of the fork 550 of the assembly 302. In the depressed position, the push-button 532 is, for example, fully depressed in the push-button cover 542.

Furthermore, when the push-button 532 is depressed, the tapered barrel 548 pushes the shutter 310 from the locked position (in which the shutter 310 blocks the external rod 576 from being connected to the internal rod 800 as shown in FIG. 24A) to the unlocked position (in which the shutter 310 allows the external rod 576 to be connected to the internal rod 800 through an opening 2400 in the shutter 310 in FIG. 24A using a tool).

Figure 25:
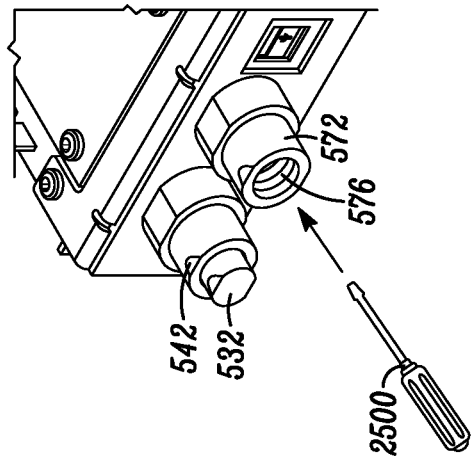
FIG. 25 illustrates the push-button of the racking device of FIGS. 1-4 in an intermediate position, in accordance with an example embodiment of the present disclosure.

Once the push-button 532 is held in the depressed position, the racking operator can be operated using a tool, manually or automatically, to rack-in or rack-out the circuit breaker 140. As shown in FIG. 25, the tool, for example, can be a screw driver 2500 or the like with a hex-shaped head or other suitable tool head configured to engage and manipulate the external rod 576. The tool is inserted into a socket of the external rod 576, and an inward force is applied to engage the external rod 576 to the internal rod 800 (e.g., in FIGS. 8 and 25) of the racking operator. Once engaged, the tool can then be rotated in one direction (e.g., clockwise) to move the slider 900 of the racking operator from the disconnected position to the connected position in which the stabs of the circuit breaker 140 are connected to the power bus.

Figure 26:
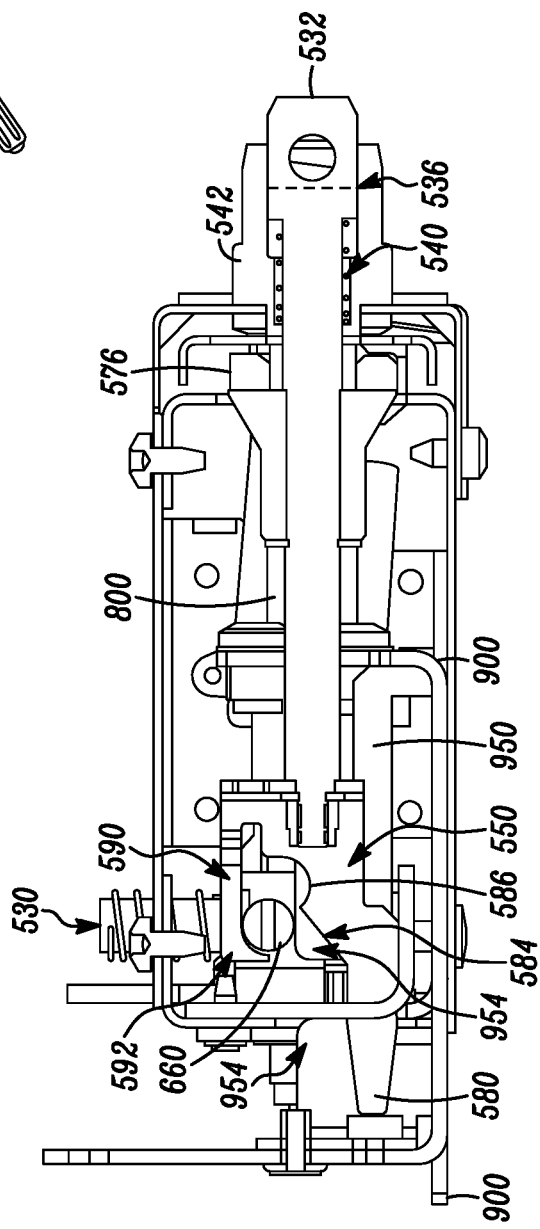
FIG. 26 illustrates a cross-sectional view of the racking device as in FIG. 22B, except that the push-button is in an intermediate position, in accordance with an example embodiment of the present disclosure.

As the tool rotates the external rod 576 and the internal rod 800, which results in the translation of the slider 900 and the indexer 950 towards the connected position, the bushing 660 is raised by the raised segment 954 of the indexer 950 out of the catch 586 of the first prong 580 and released by the first prong 580, as shown in FIG. 26. As a result, the fork 550 and the push-button operator 532 begin to retract due to the biasing force from the spring 540; however, the bushing 660 is then caught by the hook 592 of the second prong 590 of the fork 550 at an intermediate position of the push-button operator assembly 302. In the intermediate position as shown in FIGS. 24 and 25, the push-button 532 (of the push-button operator assembly 302) is partially depressed in or partially extended (e.g., 6 mm) from the push-button cover 542, with the push-button indicator 536 hidden from view in the cover 542. The intermediate position reflects that the racking device 110 has not yet reached a final position, in this example the connected position.

Figure 27:
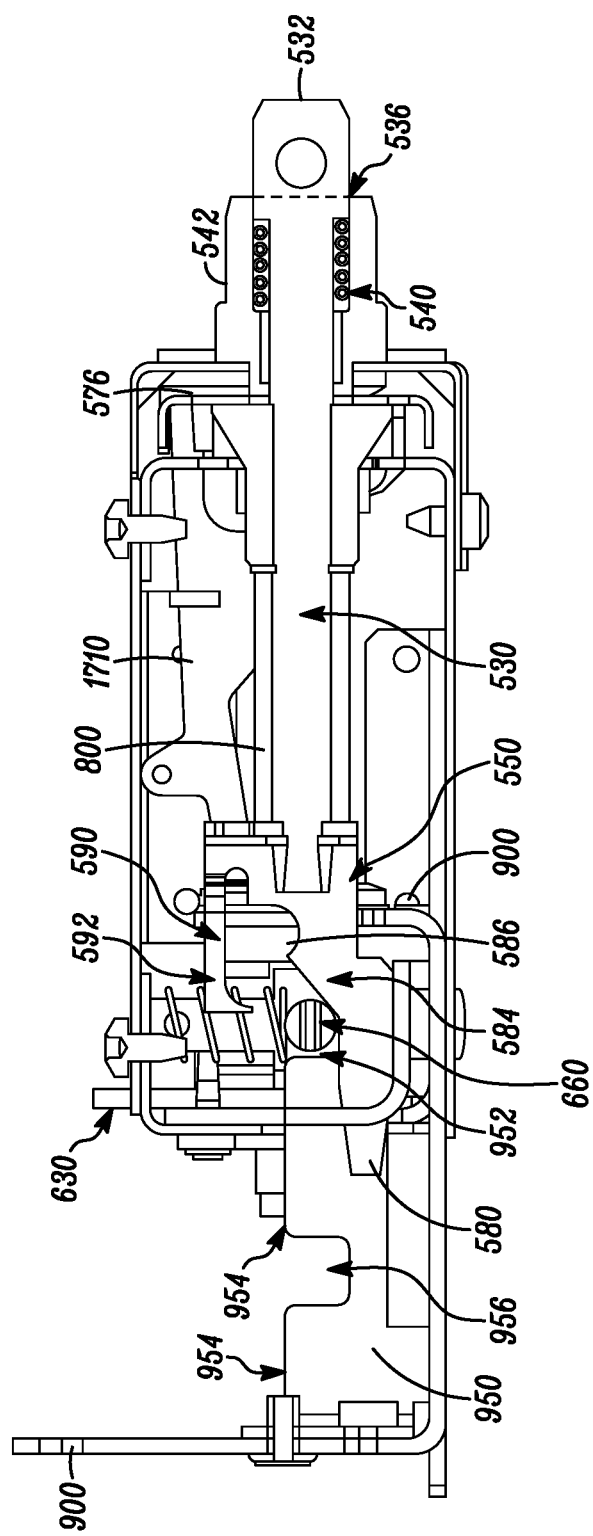
FIG. 27 illustrates a cross-sectional view of the racking device as in FIG. 26, except that the push-button is in an extended position when the racking operator is in the racked-in position, in accordance with an example embodiment of the present disclosure.
Figure 29:
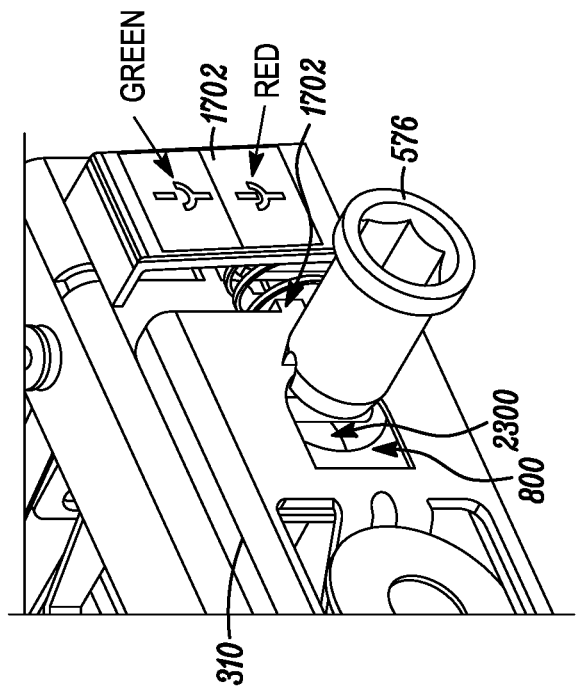
FIG. 29 illustrates a shutter assembly of the push-button interlock assembly in the locked position to prevent operation of the racking operator, in accordance with an example embodiment of the present disclosure.
Figure 28:
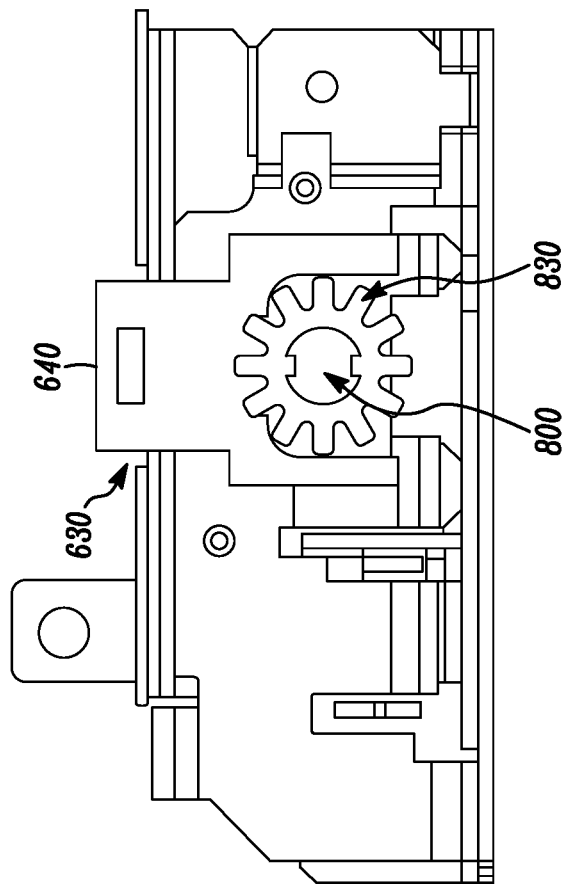
FIG. 28 illustrates a locker assembly of the push-button interlock assembly in the locked position to prevent operation of the racking operator, in accordance with an example embodiment of the present disclosure.

Accordingly, external rod 576 and the internal rod 800 can be further rotated using the tool until the slider 900 reaches the connected position, in which the stabs of the circuit breaker 140 are connected to the power bus. As shown in FIG. 27, when the slider 900 reaches the racked-in position, the bushing 660 (which is held by the hook 592 of the second prong 590 of the fork 550) is released from the second prong 590 and falls into the first slot 952 of the indexer 950. Without the bushing 660, the fork 550 is released, thereby allowing the push-button operator assembly 302 to return to the extended position with the push-button 532 fully extended outwards (e.g., popped out) and the push-button indicator 536 in full view. In the extended position (e.g., the resting position), the components of the push-button interlock assembly (e.g., the shutter 310 and the locker 630) automatically return to their locked positions to prevent the operation of the components of the racking operator (e.g., the external rod 576, and the internal rod 800), as shown in FIGS. 28 and 29. For example, when the push-button operator assembly is in the extended position, the spring-biased shutter 310 returns to the locked position once the tool is removed from the external rod 576. In this example, the status indicator 1702 is tilted upwards by the indicator arm 1710 when the slider 900 is drawn out to the connected position, and displays the connected indication (e.g., Red) through the openings 506 and 516 as in FIG. 19.

The above-describes an example of the operations of the push-button interlock assembly and the racking operator of the racking device 110 to rack-in the circuit breaker 140 to the connected position, in which the stabs of the circuit breaker 140 are connected to the power bus or other conductor. To operate the racking device 110 from the connected position to the disconnected position with the stabs disconnected from the power bus, the same sequence of operations can be performs, as described above, except that the rods 576 and 800 of the racking operator are rotated by the tool in the opposite direction (e.g., counter-clockwise) to move the slider 900 towards the racking device 100 and into the disconnected position.

It should be understood that the racking device 100 can be designed to move between two or more positions (e.g., with the addition of slots in the slider assembly 350). A three-position racking device will be discussed further below.

Figure 30:
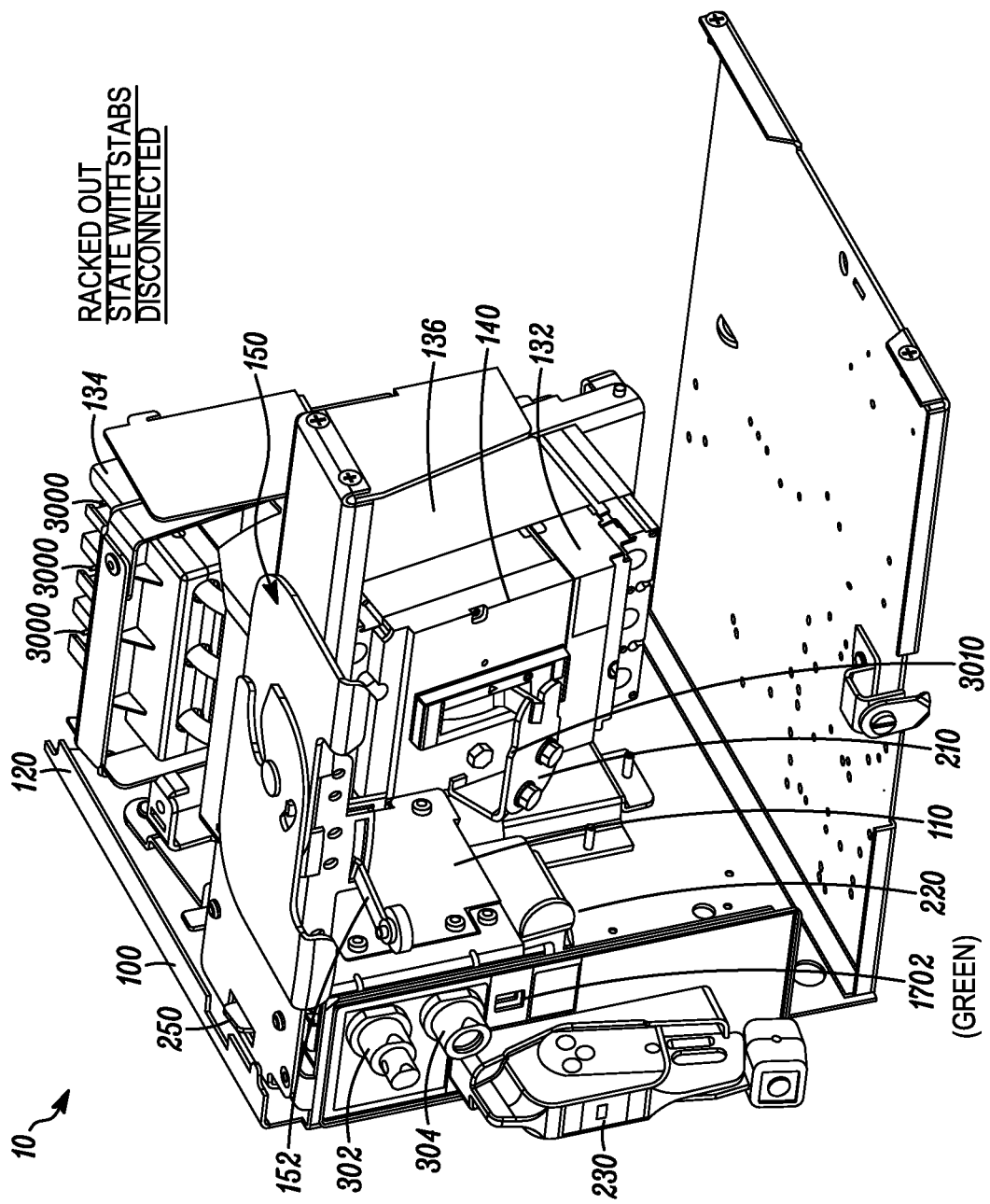
FIG. 30 illustrates example components of the unit of FIG. 1, with the racking device, and thus, the circuit breaker, in the racked-out position with the stabs of the circuit breaker disconnected from a power bus, in accordance with an example embodiment of the present disclosure.
Figure 31:
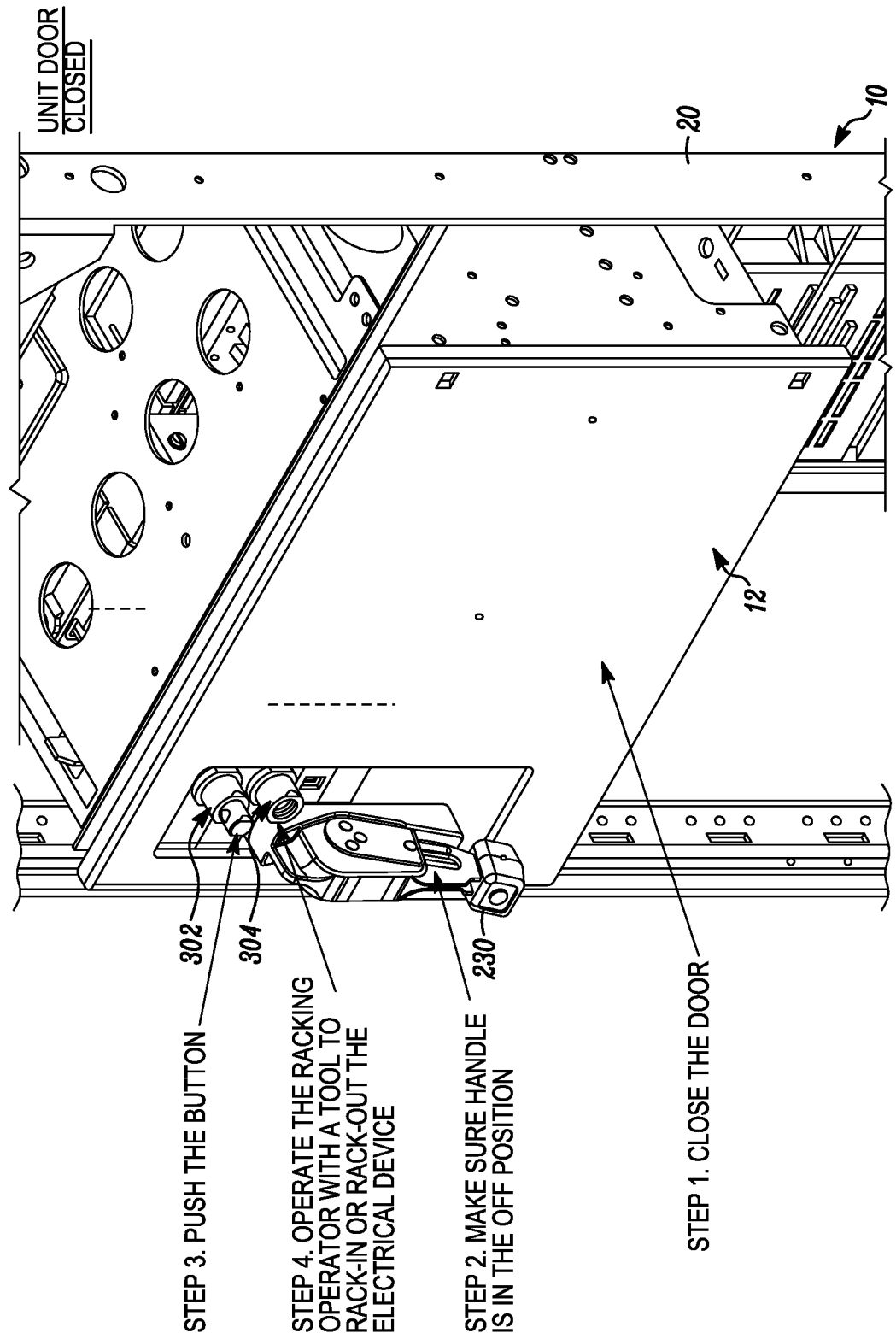
FIG. 31 illustrates example components of the unit of FIG. 1, with a door of the unit in the closed position and the operator handle in the OFF position, in accordance with an example embodiment of the present disclosure.

FIG. 30 illustrates an example of the unit 10 with the circuit breaker 140 in the disconnected position. In the disconnected position, the stabs 3000 of the circuit breaker 140, which are arranged in the shroud installation assembly 134, are disconnected from a power bus. In FIG. 30, the unit 10 is shown without a door. In the disconnected position, the structure interlock assembly 250 is in the unlocked position (e.g., its extending portion is inside of the housing 120 of the unit 10. The pin 131 of the tilting pan assembly 132 is also caught in the catch bracket 210, which prevents operation of the bail arm assembly 200, and thus, the operator handle 230 connected thereto via linkage components. A door 12 of the unit 10 is shown in FIG. 31, and is in a closed position. As previously discussed, in the closed position, the door interlock assembly 340 (e.g., the locker 1000) is disengaged from or does not block the components of the push-button operator assembly 302 (e.g., the barrel 548) in the unlocked position.

Figure 32:
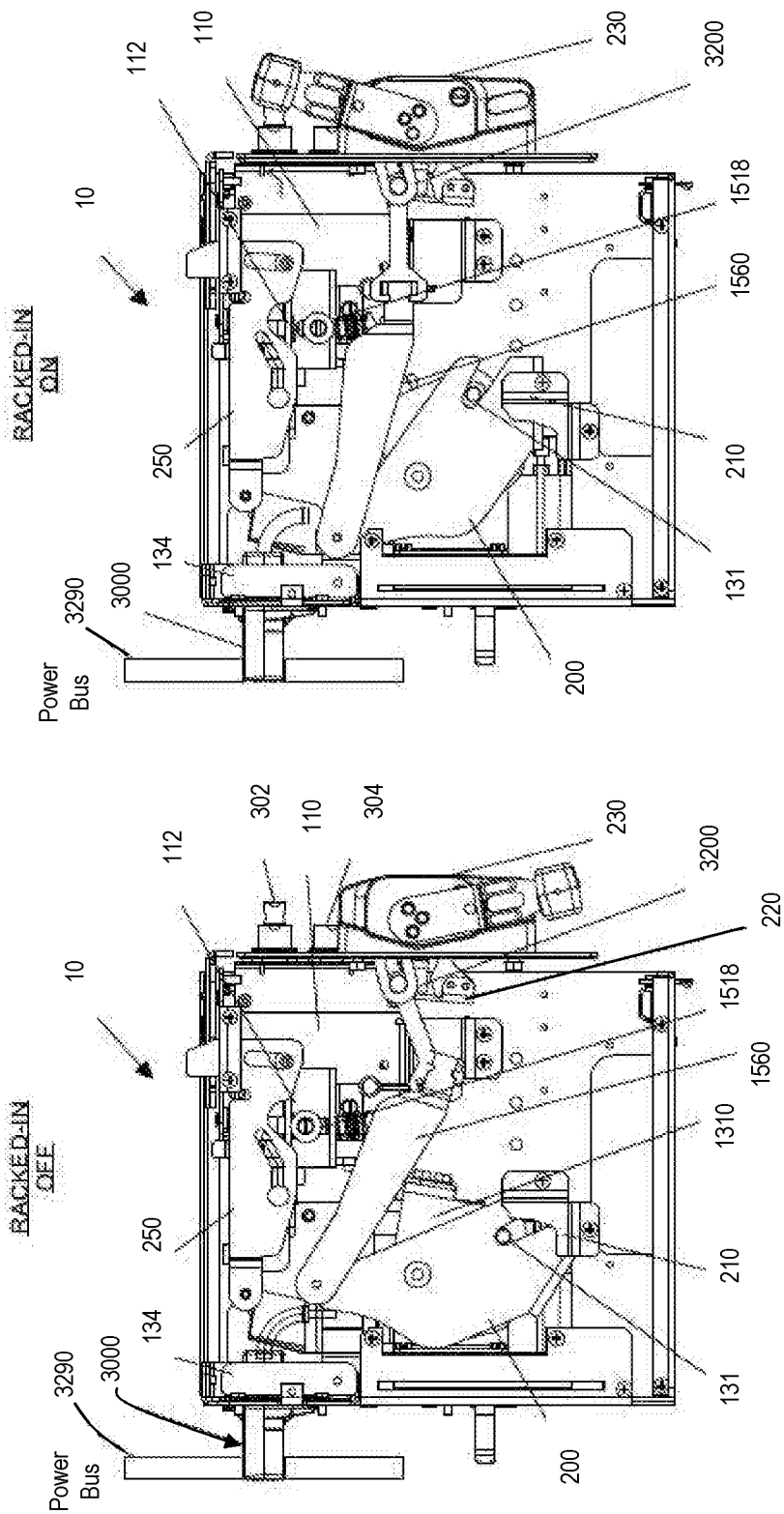
FIGS. 32A and 32B illustrate a cross-sectional view of the components of the unit of FIG. 1, with the operator handle in the OFF position and in the ON position, respectively, in accordance with an example embodiment of the present disclosure.

FIGS. 32A and 32B illustrate an open side view of the unit 10, showing the unit 10 with the circuit breaker 140, which is racked-in in the connected position, in the OFF state and the ON state, respectively. As shown in FIG. 32A, when the operator handle 230 is in the OFF position, the toggle arm 1560 of the bail arm assembly 200 is pressed against the bottom portion 1518 of the handle interlock assembly 112, which in turn lifts the blocking pin 1516 (in FIGS. 15A and 15B) so that the handle interlock assembly 112 is in the unlocked position. As shown, the operator handle 230 is connected to the toggle arm 1560 of the bail arm assembly 200 via a linkage mechanism 3200, and can be operated to manipulate an actuating arm 3010 (connected to the assembly 200) to turn the circuit breaker 140 to the ON state or the OFF state. As shown in FIG. 32B, when the operator handle 230 is in the ON position, the toggle arm 1560 of the bail arm assembly 200 is moved away from the bottom portion 1518 of the handle interlock assembly 112, so that the handle interlock assembly 112 and its blocking pin 1516 is in the locked position. In the locked position, the blocking pin 1516 engages a portion of the slider 900 such as a stop notch 970 (e.g., a notch, slot, groove, etc.) and prevents movement of the slider 900, and thus, the operation of the racking operator.

FIG. 33 illustrates an example of a three-position closed door operation racking device 10A, which is operable between three positions, namely connected position (e.g., racked-in position), test position, and a disconnected position (e.g., racked-out position). The racking device 10A is configured with an additional position, notably a test position, to connect electrical device(s) in a unit 10A, such as shown in FIGS. 36A and 36B, to a power source that is sufficient to power testing equipment. The racking device 110A can include the same or similar components as those of the racking device 110 (described herein), except that the slider assembly 350A of the racking device 10A, as shown in FIG. 34, includes an indexer 950A with three slots 3400 corresponding to the three positions. In this example, a slider 900A includes similar features as the slider 950, except that the dimensions, shape, connectors or connection points can differ depending on the application.

FIGS. 35A, 35B and 35C illustrate a front view and a side view of the racking device 110A in a disconnected position, the test position, and the connected position, respectively. As shown, the indicator 1702 displays through a window an indication of the disconnected position (e.g., Green) in FIG. 35A, an indication of the test position (e.g., Yellow) in FIG. 35B, and an indication of the connected position (e.g., Red) in FIG. 35C. The position of the indicator 1702, which determines the display through the window, is dependent on the position of an indicator arm 1710A, which is pivoted according to the position of the slider 900A. In this example, the difference in the travel distance between the disconnected position and the test position is 20 mm; the difference in the travel distance between the test position and the connected position is 35 mm; and the difference in the travel distance between the disconnected position and the connected position is 55 mm.

The racking device 110A operates in a similar manner as the racking device 110 (described herein) when going from the disconnected position to the test position or vice-a-versa, or the test position to the connected position or vice-a-versa. However, to operate the racking device 110 from the disconnected position to the connected position or vice-a-versa, the racking device 110 undergoes two separate sequences of a push-button operation followed by a racking operation. For example, press the push-button, operate the racking device to move the slider 900A from the disconnected position to the test position at which time the push-button is released to complete one sequence, press the push-button again, and operate the racking device 110A to move the slider 900A from the test position to the connected position at which time the push-button is released to complete another sequence.

It should be understood that the various interlock mechanisms described herein are provided as examples. The size, shape and the connecting mechanism between different components of the interlocks and devices, described herein, can be varied, including combined or separated into additional sub-components, to perform the interlocking operations described herein. Various fasteners can be used to connect the components described herein in a fixed, movable, pivotable or other relationship relative to each other, such as with nuts, screws, pins, or other male-female fastening devices. The interlock mechanisms can be used with electrical devices and systems, configured to meet different industrial standards including but not limited to IEC (International Electrotechnical Communication) standards and UL (Underwriters Laboratory, Inc.).

It should also be understood that the example embodiments disclosed and taught herein are susceptible to numerous and various modifications and alternative forms. Thus, the use of a singular term, such as, but not limited to, "a" and the like, is not intended as limiting of the number of items.

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A racking device for racking-in or racking-out an electrical device having electrical stabs from outside of a housing that houses the electrical device, the racking device comprising:

a racking operator assembly to rack-in the electrical device and connect the stabs to a power bus in a connected position and to rack-out the electrical device and disconnect the stabs from the power bus in a disconnected position, the racking operator assembly including a rotatable rod assembly and a translatable slider assembly connectable to a moveable support for the electrical device, the rod assembly being operable from outside of the housing to move the slider assembly between the disconnected position and the connected position when the rod assembly is rotated, the slider assembly including an indexer having a first slot, a second slot, and a raised segment adjacent to the first and second slots which are arranged along a length of the indexer, the rod assembly including a gear; and a push-button interlock assembly including:

a spring-loaded locker assembly having a locker with a gear lock connected to a bushing, the locker being moveable between a locked position and an unlocked position, the locked position preventing movement of the slider assembly when the gear lock of the locker is engaged to the gear of the rod assembly and the bushing is situated in one of the slots of the indexer, the unlocked position allowing movement of the slider assembly between the disconnected position and the connected position when the gear lock of the locker is disengaged from the gear of the rod assembly, and a spring-loaded push button operator assembly including a fork having first and second prongs and a push button assembly with an external push-button to be arranged outside the housing, the push button connected to the fork, the first prong having a ramped surface leading to a catch, the second prong having a hook, the push button being operable from an extended position to a depressed position in order to release the gear lock into the unlocked position, wherein, when the push-button is depressed, the first prong of the fork picks up the bushing from one of the first and second slots and places the bushing into the catch which raises the bushing, and thus, the gear lock to the unlocked position, wherein, when the gear lock is in the unlocked position, the rod assembly is operable to move the slider assembly from one of the disconnected and connected positions to the other of the disconnected and connected positions, the movement of the slider assembly lifting the bushing out of the catch and onto the raised segment of the indexer where the bushing is caught by the hook of the second prong of the fork to hold the push-button operator assembly in an intermediate position, and wherein, after the push-button operator assembly has reached the intermediate position, the rod assembly is operable to move the slider assembly into the other of the disconnected and connected positions in which the bushing drops into the other of the first and second slots and the push-button operator assembly returns to the extended position.

2. The device according to claim 1, wherein the push-button operator assembly includes an external push-button cover for covering the push-button, the push-button being fully extended from the push-button cover in the extended position, the push-button being partially extended from the push-button cover in the intermediate position, and the push-button being fully covered in the depressed position.

3. The device according to claim 1, further comprising:
a door interlock assembly to prevent operation of the push-button operator assembly when a door of the housing is open.

4. The device according to claim 3, wherein the door interlock assembly includes a spring-biased push-button locker operable between an unlocked position to allow operation of the push-button operator assembly and a locked position to prevent operation of the push-button operator assembly, the push-button locker including a finger and a stop bracket, the stop bracket being engaged to the push-button operation assembly in the locked position to prevent operation thereof and being disengaged from the push-button operation assembly in the unlocked position to allow operation thereof, the finger being connectable to a lever via a spring which is connected between the finger and the lever, the lever being moveable between a door open position when the door is open and a door closed position when the door is closed, wherein, when the finger is pulled by the lever in the closed door position via the spring, the stop bracket is disengaged from the push-button operation assembly into the unlocked position.

5. The device according to claim 4, wherein the push-button operation assembly further includes a shaft connected between the push-button and the fork, and a push-button barrel arranged on the shaft, the stop bracket blocking the push-button barrel to prevent operation of the push-button operator assembly when the push-button locker is in the locked position.

6. The device according to claim 1, wherein the rod assembly includes a rotatable rod having threads along a length of the rod, and the slider assembly including a slider and a barrel connected to the slider, the barrel including a threaded bore for engaging the threads of the rod, the slider moving along a length of the rod when the rod is rotated.

7. The device according to claim 1, wherein the rod assembly comprises:
an internal rod connected to the slider assembly,
a spring-biased external rod having a tool receptacle for receiving a tool, the external rod having an extended position in which the external rod is disengaged from the internal rod, and a depressed position in which the external rod is engaged to the internal rod, the external rod being operable between the extended position and the depressed position using the tool,
wherein, in the depressed position, the external rod is rotatable in one direction to move the slider via the internal rod to the disconnected position or the connected position.

8. The device according to claim 7, wherein the push-button interlock assembly further comprises:
a shutter interlock including a shutter which is moveable between a shutter unlocked position and a shutter locked position, the shutter including a shutter opening, the shutter unlocked position allowing the external rod to extend through the shutter opening and engage the internal rod in the depressed position, the shutter locked position preventing the external rod from engaging the shaft,
wherein the push-button operator assembly further includes a tapered push-button barrel connected to the push-button, and
wherein, when the push-button is depressed, the push-button barrel moves the shutter from the shutter locked position to the shutter unlocked position.

9. The device according to claim 1, further comprising:
an operator handle interlock assembly to prevent operation of the slider assembly when an operator handle assembly for the electrical device is in an ON position which turns ON the electrical device, the operator handle interlock assembly including a spring-biased slider locker carrying a blocking pin which is moved by the operator handle assembly to a pin locked position when the operator handle assembly is in the ON position and to a pin unlocked position when the operator handle assembly is in an OFF position to turn OFF the electrical device, the blocking pin engaging the slider assembly in the pin locked position and disengaging from the slider assembly in the pin unlocked position.

10. The device according to claim 1, further comprising:
a racking device housing for housing at least the internal rod, a portion of the slider assembly shaft and the locker assembly, the push button being arranged on an exterior of the racking device housing.

11. The device according to claim 1, wherein the electrical device is a circuit breaker.

12. An electrical unit for an electrical cabinet having a power bus, the electrical unit comprising:
- a housing including a door;
- an electrical device comprising a circuit breaker having electrical stabs;
- a support for supporting the electrical device;
- an operator handle assembly, which is connected to the support, to turn ON or OFF the electrical device; and
- a racking device comprising:
- a racking operator assembly to rack-in the electrical device and connect the stabs to a power bus in a connected position and to rack-out the electrical device and disconnect the stabs from the power bus in a disconnected position, the racking operator assembly including a rotatable rod assembly and a translatable slider assembly connectable to a moveable support for the electrical device, the rod assembly being operable from outside of the housing to move the slider assembly between the disconnected position and the connected position when the rod assembly is rotated, the slider assembly including an indexer having a first slot, a second slot, and a raised segment adjacent to the first and second slots which are arranged along a length of the indexer, the rod assembly including a gear; and
- a push-button interlock assembly including:
  - a spring-loaded locker assembly having a locker with a gear lock connected to a bushing, the locker being moveable between a locked position and an unlocked position, the locked position preventing movement of the slider assembly when the gear lock of the locker is engaged to the gear of the rod assembly and the bushing is situated in one of the slots of the indexer, the unlocked position allowing movement of the slider assembly between the disconnected position and the connected position when the gear lock of the locker is disengaged from the gear of the rod assembly, and
  - a spring-loaded push button operator assembly including a fork having first and second prongs and a push button assembly with an external push-button to be arranged outside the housing, the push button connected to the fork, the first prong having a ramped surface leading to a catch, the second prong having a hook, the push button being operable from an extended position to a depressed position in order to release the gear lock into the unlocked position, wherein, when the push-button is depressed, the first prong of the fork picks up the bushing from one of the first and second slots and places the bushing into the catch which raises the bushing, and thus, the gear lock to the unlocked position, wherein, when the gear lock is in the unlocked position, the rod assembly is operable to move the slider assembly from one of the disconnected and connected positions to the other of the disconnected and connected positions, the movement of the slider assembly lifting the bushing out of the catch and onto the raised segment of the indexer where the bushing is caught by the hook of the second prong of the fork to hold the push-button operator assembly in an intermediate position, and wherein, after the push-button operator assembly has reached the intermediate position, the rod assembly is operable to move the slider assembly into the other of the disconnected and connected positions in which the bushing drops into the other of the first and second slots and the push-button operator assembly returns to the extended position.

* * * * *